(12) United States Patent
Dodge et al.

(10) Patent No.: US 7,463,371 B2
(45) Date of Patent: *Dec. 9, 2008

(54) ORDERING OF EVENTS BETWEEN DIFFERENT INPUT SOURCES

(75) Inventors: Steve Dodge, Sammamish, WA (US); Alexander J. Kolmykov-Zotov, Sammamish, WA (US); Arin J. Goldberg, Woodinville, WA (US); Brigette Krantz, Redmond, WA (US); Kyril Feldman, Kirkland, WA (US); Manoj K. Biswas, Bellevue, WA (US); Rudolph Balaz, Redmond, WA (US); Shenbagalakshmi Pichaiah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 240 days.

This patent is subject to a terminal disclaimer.

(21) Appl. No.: 10/986,882

(22) Filed: Nov. 15, 2004

(65) Prior Publication Data

US 2005/0088420 A1    Apr. 28, 2005

Related U.S. Application Data

(63) Continuation of application No. 10/879,527, filed on Jun. 30, 2004.

(60) Provisional application No. 60/513,591, filed on Oct. 24, 2003.

(51) Int. Cl.
*G06F 15/00* (2006.01)
(52) U.S. Cl. .......................... 358/1.1; 345/173
(58) Field of Classification Search ........... 715/224, 715/808, 863; 345/173; 178/18.03; 709/220; 710/10; 455/406, 408; 358/1.1
See application file for complete search history.

(56) References Cited

U.S. PATENT DOCUMENTS

| 5,500,937 | A | 3/1996 | Thompson-Rohrlich |
| 5,534,893 | A | 7/1996 | Hansen, Jr. et al. |
| 5,710,831 | A | 1/1998 | Beernink et al. |
| 5,802,388 | A * | 9/1998 | Zetts et al. ............. 715/541 |
| 5,893,126 | A | 4/1999 | Drews et al. |
| 5,919,249 | A | 7/1999 | Hebstman et al. |
| 5,920,688 | A | 7/1999 | Cooper et al. |
| 5,953,523 | A | 9/1999 | Martinez et al. |
| 6,083,277 | A | 7/2000 | Fowlow et al. |
| 6,128,007 | A | 10/2000 | Seybold |
| 6,249,810 | B1 | 6/2001 | Kiraly |
| 6,268,859 | B1 | 7/2001 | Andresen et al. |
| 6,355,889 | B1 * | 3/2002 | Butcher et al. ......... 178/18.03 |

(Continued)

FOREIGN PATENT DOCUMENTS

EP    0 566 293 A2    4/1993

OTHER PUBLICATIONS

Search Report and Written Opinion from PCT Application No. US04/24194 dated Sep. 12, 2005.
Walid G. Aref et al., "On Handling Electronic Ink", ACM Computing Surveys, vol. 27, No. 4, Dec. 1995.
David R. Millen, "Pen-Based User Interfaces", AT&T Technical Journal, May/Jun. 1993.
Nancy J. Freehafer, "Handwriting Recognition in Office XP", Jul. 30, 2001.

*Primary Examiner*—Saeid Ebrahimi Dehkordy
(74) *Attorney, Agent, or Firm*—Banner & Witcoff, Ltd

(57) ABSTRACT

A system and process for ensuring the smooth flow of electronic ink is described. Dynamic rendering is give priority over other event handlers. Priority may be the use of one or more queues to order when events occur and may be performing dynamic rendering prior to other steps.

3 Claims, 26 Drawing Sheets

U.S. PATENT DOCUMENTS

| | | |
|---|---|---|
| 6,498,610 B1 | 12/2002 | Glaspy, Jr. |
| 6,556,205 B1 | 4/2003 | Gould et al. |
| 6,577,635 B2 | 6/2003 | Narayana et al. |
| 6,608,697 B1 | 8/2003 | Schorr et al. |
| 6,754,386 B1 | 6/2004 | Williamson et al. |
| 6,782,539 B2 | 8/2004 | Gould |
| 6,791,552 B2 | 9/2004 | Gould et al. |
| 6,885,374 B2 | 4/2005 | Doyle et al. |
| 6,943,787 B2 | 9/2005 | Webb |
| 2003/0025675 A1 | 2/2003 | Dresevice et al. |
| 2003/0177286 A1 | 9/2003 | Gould |
| 2003/0227438 A1 | 12/2003 | Campbell et al. |
| 2004/0070616 A1 | 4/2004 | Hildebrandt et al. |
| 2004/0156379 A1 | 8/2004 | Walls et al. |
| 2005/0034062 A1 | 2/2005 | Bufkin et al. |
| 2005/0044106 A1 | 2/2005 | Duncan et al. |
| 2005/0093833 A1 | 5/2005 | Dodge et al. |
| 2005/0093836 A1 | 5/2005 | Dodge et al. |
| 2005/0093838 A1 | 5/2005 | Dodge et al. |
| 2005/0093839 A1 | 5/2005 | Dodge et al. |
| 2005/0093840 A1 | 5/2005 | Dodge et al. |
| 2005/0093841 A1 | 5/2005 | Dodge et al. |
| 2005/0093842 A1 | 5/2005 | Dodge et al. |
| 2005/0093843 A1 | 5/2005 | Dodge et al. |
| 2005/0093844 A1 | 5/2005 | Dodge et al. |
| 2005/0156913 A1 | 7/2005 | Dodge et al. |
| 2005/0211118 A1 | 9/2005 | Bachmeir et al. |
| 2006/0132817 A1 | 6/2006 | Dodge et al. |
| 2006/0274057 A1 | 12/2006 | Van Ness et al. |

* cited by examiner

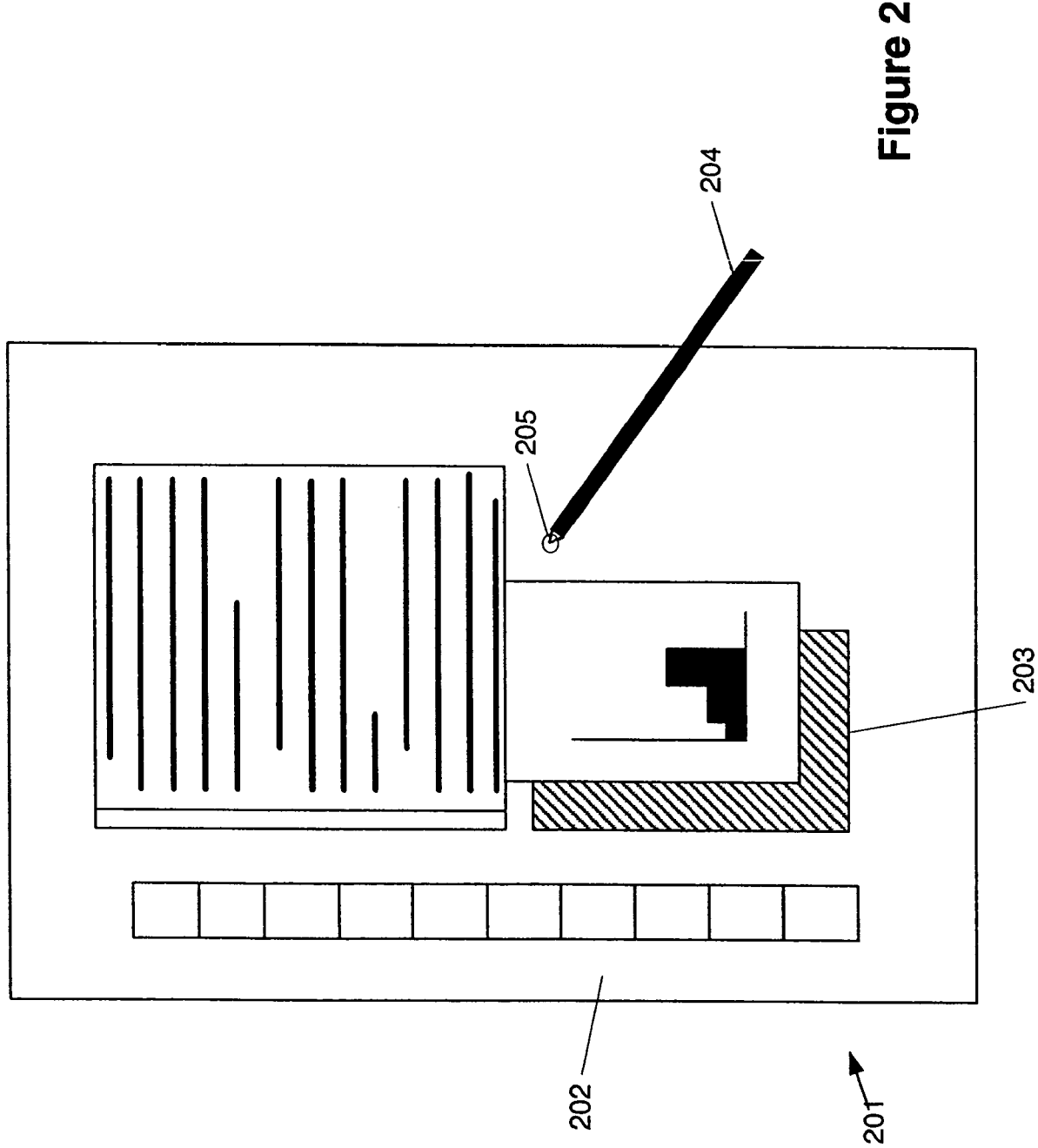

ORDERING OF EVENTS BETWEEN DIFFERENT INPUT SOURCES

RELATED APPLICATION INFORMATION

This application is a Continuation of U.S. application Ser. No. 10/879,527 filed on Jun. 30, 2004; which is a Provisional of 60/513,591, filed Oct. 24, 2003, hereby incorporated by reference as to their entirety.

This application claims priority to U.S. Ser. No. 60/513,591, filed Oct. 24, 2003, entitled "Tablet Platform Controls and APIs" whose contents are expressly incorporated herein by reference.

BACKGROUND OF THE INVENTION

1. Field of the Invention

Aspects of the present invention relate to image processing and information manipulation. More specifically, aspects of the present invention relate to receiving and handling electronic ink information.

2. Description of Related Art

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface.

The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document on-screen because of the ability to freely make notes outside of the confines of the keyboard and mouse interface.

When a user writes with a pen, he expects ink to flow from the pen tip. In the electronic ink realm, a similar goal exists. One issue that impedes electronic ink from flowing from a pen or stylus is how the electronic ink is handled.

Previous approaches have attempted to handle all aspects of inking at the same time. Once ink information exists, previous approaches have attempted to render the ink, look for gestures, combine the ink information with other ink information, recognize the ink, and smooth the appearance of the ink, among other processes. These processes have caused delays in displaying ink to a user, thereby making the user wait to enter more ink and, more importantly, reduce or eliminate the illusion that ink is flowing from the tip of the electronic stylus.

BRIEF SUMMARY

Aspects of the present invention address one or more of the issues mentioned above, thereby providing flow of ink from a stylus. A dynamic render object may be moved about in a process flow to reduce a delay between a user's movement and the display of electronic ink.

These and other aspects are addressed in relation to the Figures and related description.

BRIEF DESCRIPTION OF THE DRAWINGS

FIG. 2 shows a display for a stylus-based input system according to aspects of the present invention.

DETAILED DESCRIPTION

Figure 1:
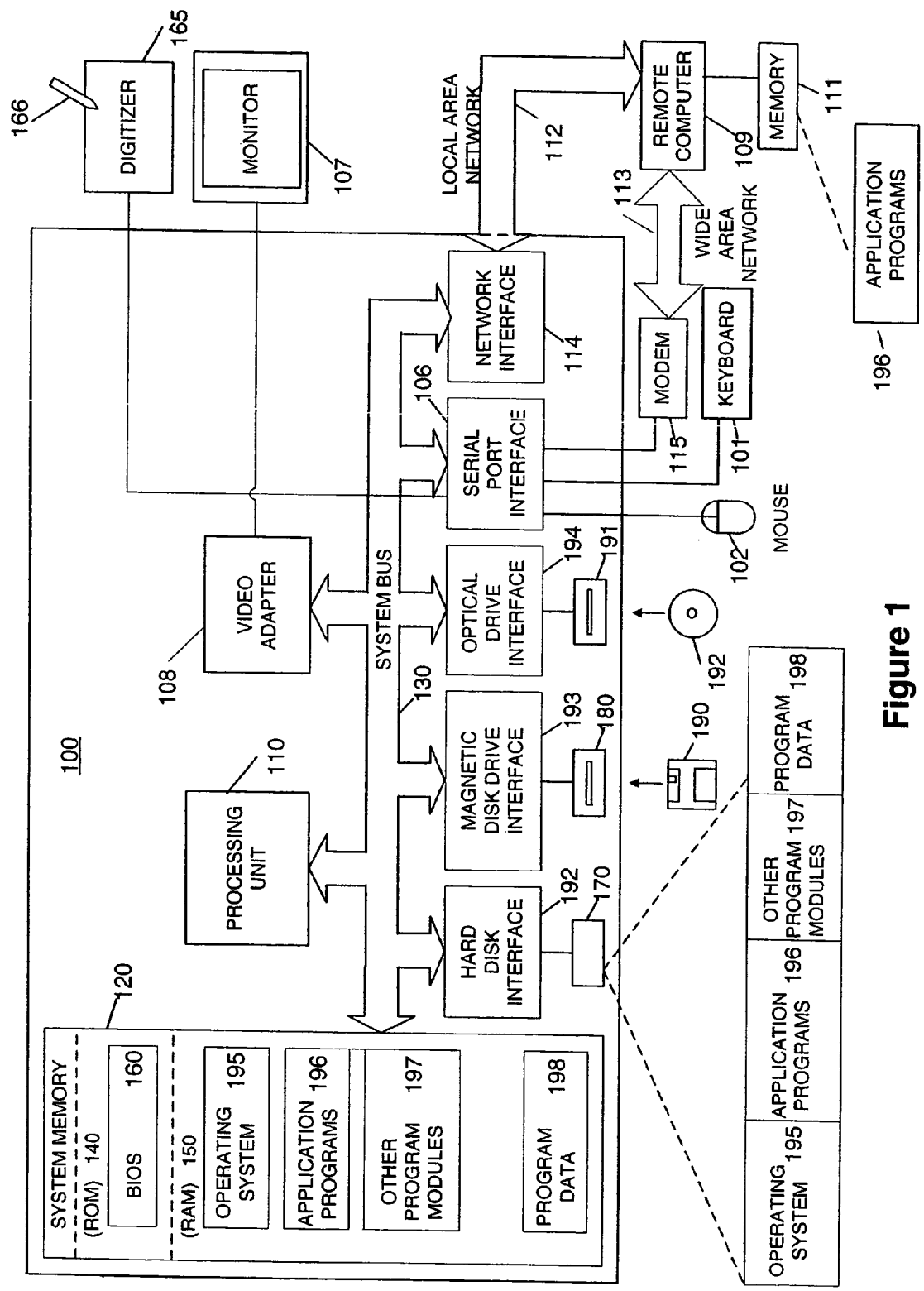
FIG. 1 illustrates a schematic diagram of a general-purpose digital computing environment in which certain aspects of the present invention may be implemented.

Aspects of the present invention relate to handing stylus events in an efficient manner to quickly render electronic ink to a user.

This document is divided into sections to assist the reader. These sections include: characteristics of ink, terms, general-purpose computing environment, real-time inking overview, object model, dynamic rendering and wet ink, gesture recognition, synchronous and asynchronous processes, cascading, dynamic plug-in collection modification, error propagation, managed/unmanaged illustrations, data sets and flows, data synchronization, and application programming interfaces.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Terms

Ink A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level Ink object A data structure storing ink with or without properties.

Stroke A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point Information defining a location in space. For example, the points may be defined relative to a capturing space (for example, points on a digitizer), a virtual ink space (the coordinates in a space into which captured ink is placed), and/or display space (the points or pixels of a display device).

Document Any electronic file that has a viewable representation and content. A document may include a web page, a word processing document, a note page or pad, a spreadsheet, a visual presentation, a database record, image files, and combinations thereof.

RealTimeStylus The real time stylus is an object that provides real time stylus events on a given window handle within a given window input rectangle. The real time styles can also be considered as a framework to which to add plug-in objects that handle additional functions. The plug-in objects may be added and removed as the desired functionality of the real time stylus changes. The API for the real time stylus may be referred to as RTS. RTS may be a core API component to which developers can tie other functions. The RTS packages the raw data coming from pen services and forwards the data to the first plug-in object (if any). The real time stylus may have one or more interfaces. In the case of two interfaces, these may be a synchronous interface and an asynchronous interface. These interfaces provide locations to which plug-ins may be connected to the real time stylus These interfaces are for illustrative purposes only. Other interfaces may be used as well.

Real Time Ink Real time ink is the illusion that ink is flowing from the tip of the stylus. Prior approaches have attempted to couple significant processing steps with the rendering of ink, thereby slowing down the display of newly received strokes. Real time ink attempts to push the newly received strokes to the display as they are received and attempts to separate the real-time processing steps and the real-time display to operate together, thereby displaying ink faster to a user.

Plug-in A plug-in is a functional component that may be added to the real time stylus object. If a plug-in is attached to a synchronous interface of the real time stylus object, it may be referred to as a synchronous plug-in. If a plug-in is attached to an asynchronous interface of the real time stylus object, it may be referred to as an asynchronous plug-in.

Pen Service A system service component that interfaces with the digitizer hardware driver and provides raw "packet" data that has been pre-interpreted into standard "packet" and related structures, along with other notifications independent of ink collection that are still relevant to Tablet functionality (e.g. TabletAdded/Removed, StylusButtonUp/Down, etc). Pen services provide the primary mechanism for packets to be handled by a plug-in collection.

Plug-in Collection A collection of plug-ins, in one or more groups, that are attached to the RTS. Where two collections exist, they may be associated with the synchronous and asynchronous interfaces of the RTS, respectively. Each collection may be executed in order. Where two or more collections exist, they may be executed independent of each other because they may be attached to different interfaces of the RTS (or RTSs). Data returns to the RTS after being handled by each plug-in. The order of plug-ins in the collection may affect the output of the collection.

Plug-in Chain A chain of plug-ins where each grouping of plug-ins is connected in series. Here, data work their way through each plug-in in the chain prior to returning to the RTS. The chain may also be referred to as a "daisy chain" of plug-ins. The order of the plug-ins in the chain or daisy chain may affect the output of the chain.

Input Queue A temporary holding queue for packets or objects that are generated by a synchronous plug-in collection or plug-in chain for reprocessing by the synchronous plug-in collection or plug-in chain. In short, the synchronous plug-in collection or plug-in chain can push objects into the input queue.

Dynamic Rendering The incremental process of drawing ink while the pen is touching the screen. As the pen moves across the digitizer a trail of "ink" is left behind on the screen. The effect appears as if the ink is flowing from the pen as it is being drawn. The ink is drawn piecemeal as the data is received. The rendering may also have additional effects applied such as anti-aliasing and the like.

Static Rendering The process of rendering an entire ink stroke at one time. The data is already available before the ink is drawn and the entire stroke is drawn as a single unit. Static rendering may also have additional effects applied such as Bezier smoothing and anti-aliasing.

Dynamic Renderer The developer may optionally instantiate a dynamic renderer to automatically provide highly efficient rendering of real time packet data to a GDI rendering surface. Dynamic renderers for other rendering surfaces, like DirectX or a plotter are possible using the same interface definition as the GDI-centric DynamicRenderer provided as part of the implementation of aspects of this invention.

Gesture Recognizer The developer may optionally instantiate a gesture recognizer to perform real-time recognition of strokes and report when one or more strokes constitute a gesture in which the developer has expressed interest. The gesture recognizer may, if it is used, be placed in the synchronous or asynchronous collection or chain.

Output Queue Once the packet data has flowed through the collection or chain of objects (and potentially has been modified), it is deposited in the output queue where the RTS the sends it to the collection of asynchronous plug-ins or chain.

InkCollectingObject Describes an asynchronous plug-in object that accumulates and stores ink data provided by the Real Time Stylus.

ICO An ink collection object that may be in an asynchronous collection or chain. It receives data from the output queue.

General-Purpose Computing Environment

FIG. 1A illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency or requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices including smart phones, smart watches, and personal data assistants, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
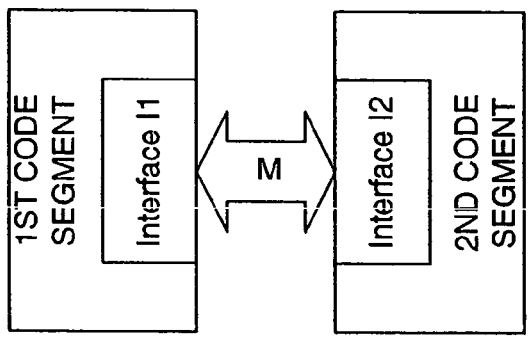
FIGS. 1B through 1M show a general-purpose computer environment supporting one or more aspects of the present invention.
Figure 1E:
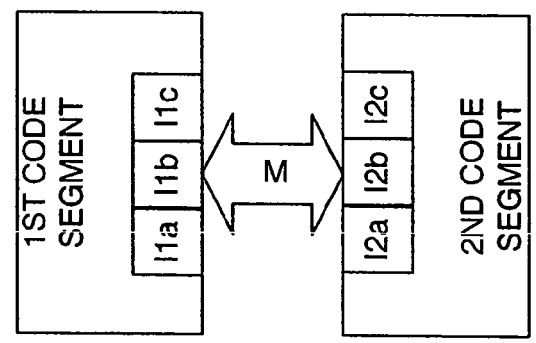
Figure 1B:
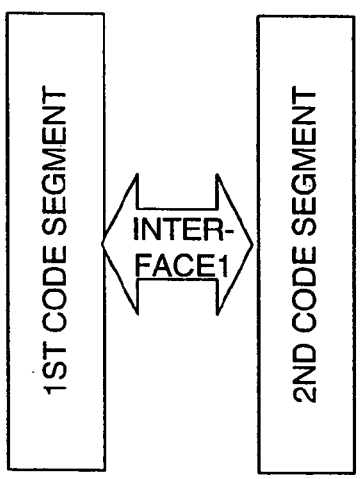

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
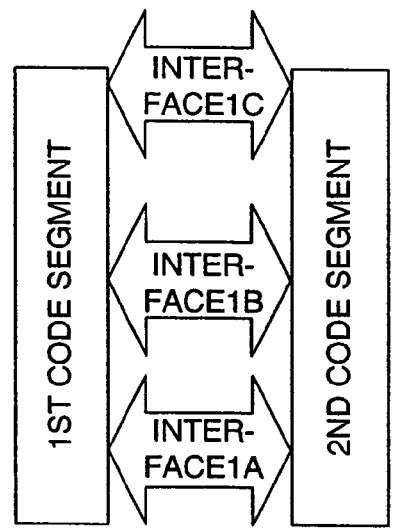

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1G:
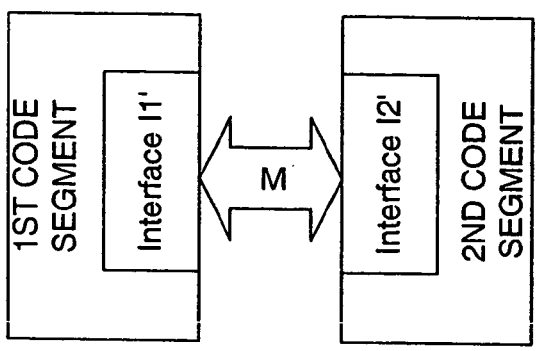
Figure 1I:
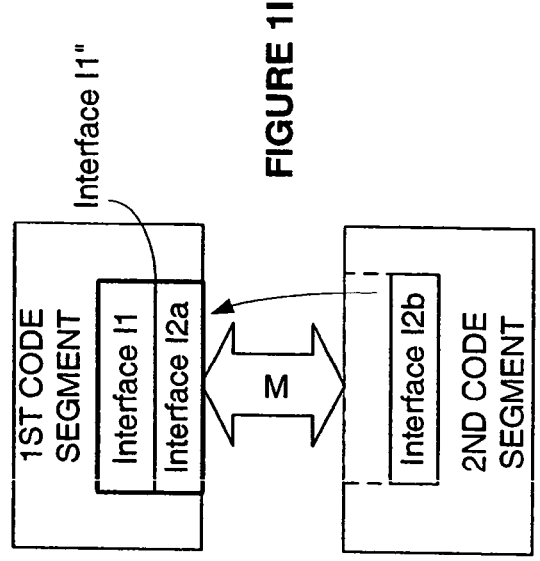
Figure 1F:
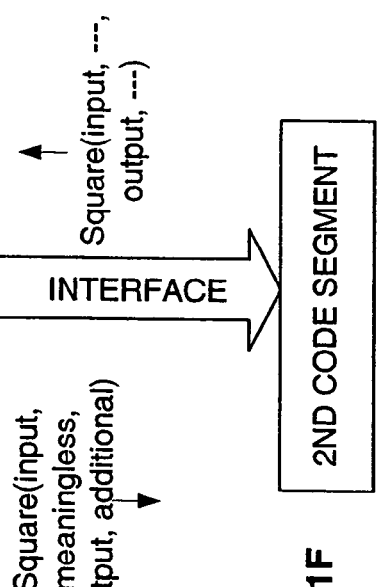

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
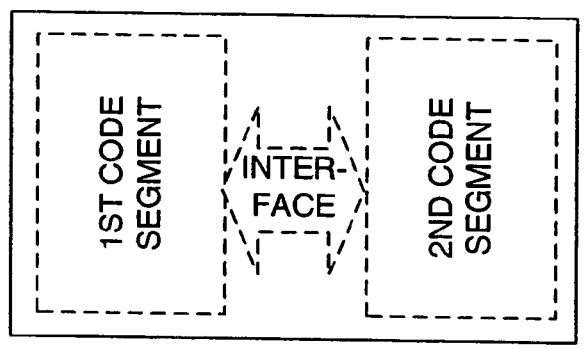

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2 which after processing the value passed with input (to calculate the square of an input) by the second code segment, passes back the squared result with output. In such a case, the processing performed by the second code segment (squaring input) can be performed by the first code segment without a call to the interface.

D. Divorce

Figure 1K:
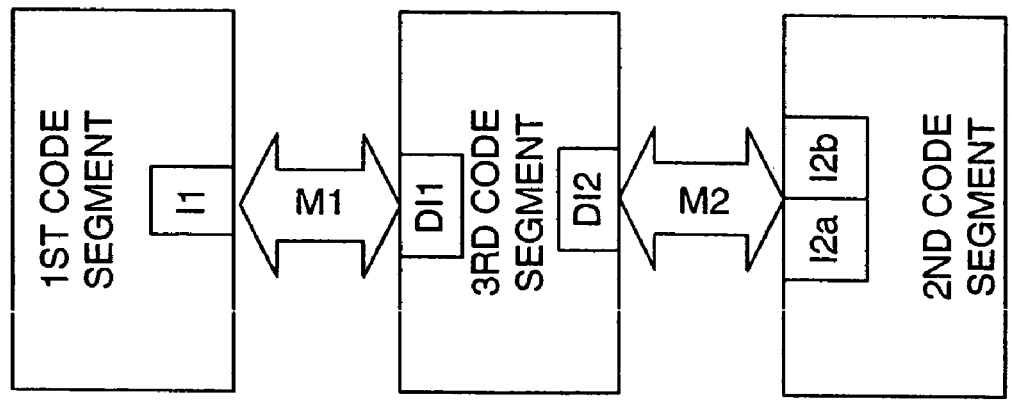
Figure 1J:
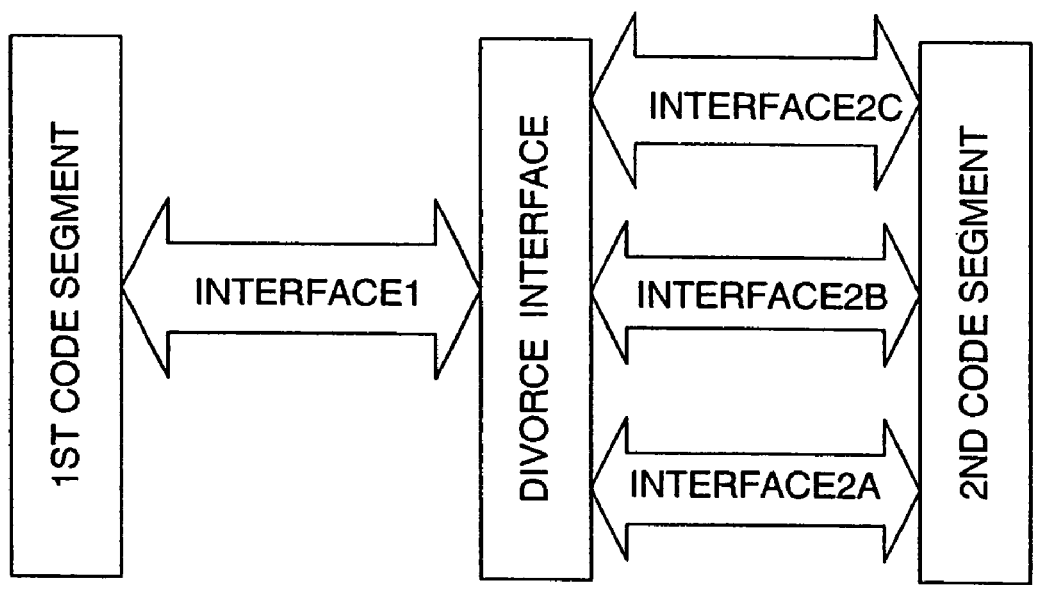

A communication from one code segment to another may be accomplished indirectly by breaking the communication into multiple discrete communications. This is depicted schematically in FIGS. 1J and 1K. As shown in FIG. 1J, one or more piece(s) of code (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
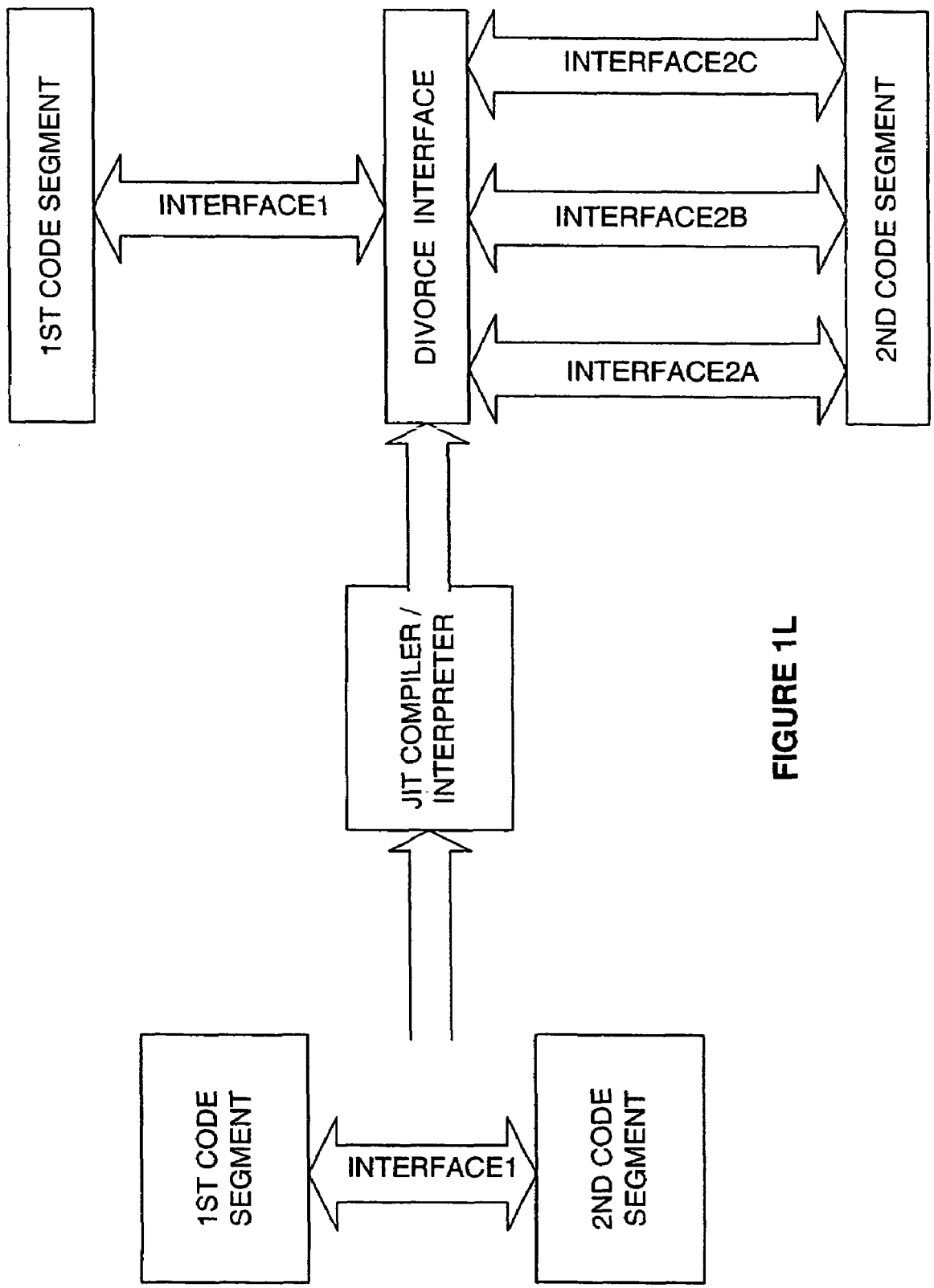
Figure 1M:
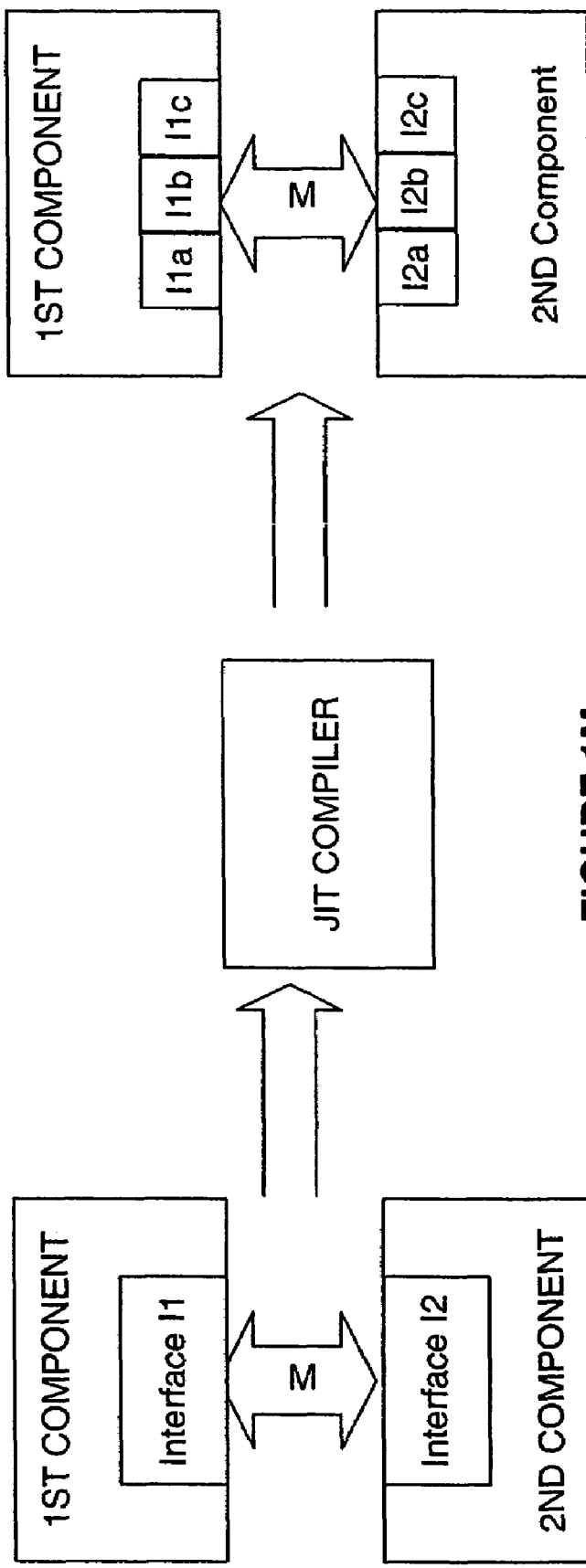

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the Net programming model from Microsoft Corporation.

Real-Time Inking Overview

Using a stylus or pen, a user creates electronic ink. The ink is handled by a system that allows the ink to be displayed closer to a time the user creates the ink, rather than waiting until additional processes have been completed.

Figure 3:
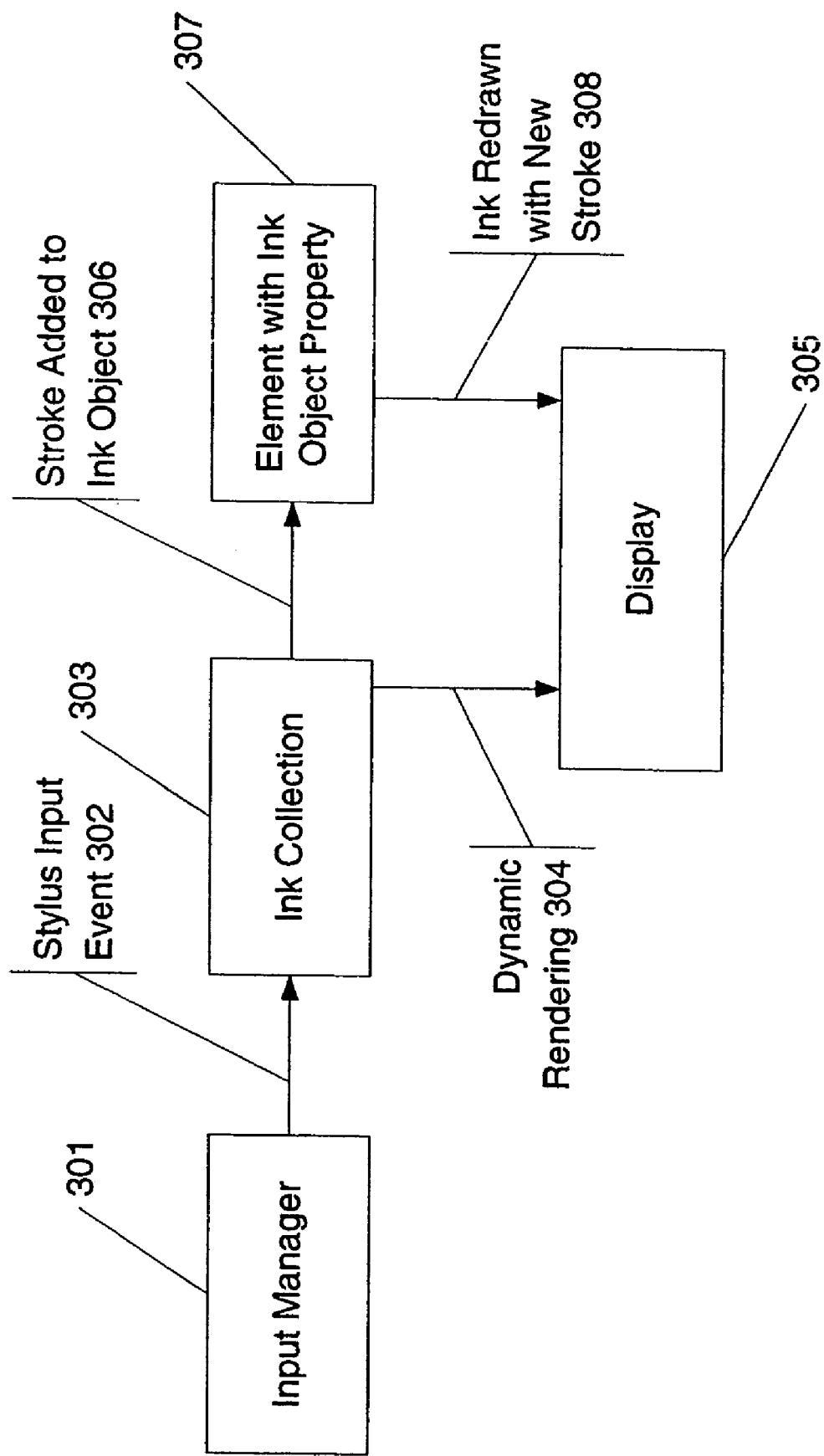
FIG. 3 shows a system for handling the flow of electronic ink in accordance with aspects of the present invention.

FIG. 3 shows an illustrative system for handling electronic ink in accordance with aspects of the present invention. An input manager receives ink in the input manager 301. Various input managers exist in the art including pens and digitizing tablets, Wacom tablets, and the like. The existence of the ink data is referred to as a stylus input event 302. Next, the stylus input event 302 is handled by an ink gatherer 303. The ink collection object 303 performs initial handling of the information from the input manager 301. The system then dynamically renders the ink 304 for output on display 305. Other components may handle the more complete processing of ink. For instance, a stroke may be added to an existing ink object 306 (or may create a new ink object to contain the ink stroke) and may associate the received ink (referred to as data) with one or more properties. This is shown by the component with ink object property 307. The ink object may then be redrawn (if smoothing is desired) 308 for display on display 305.

Figure 4:
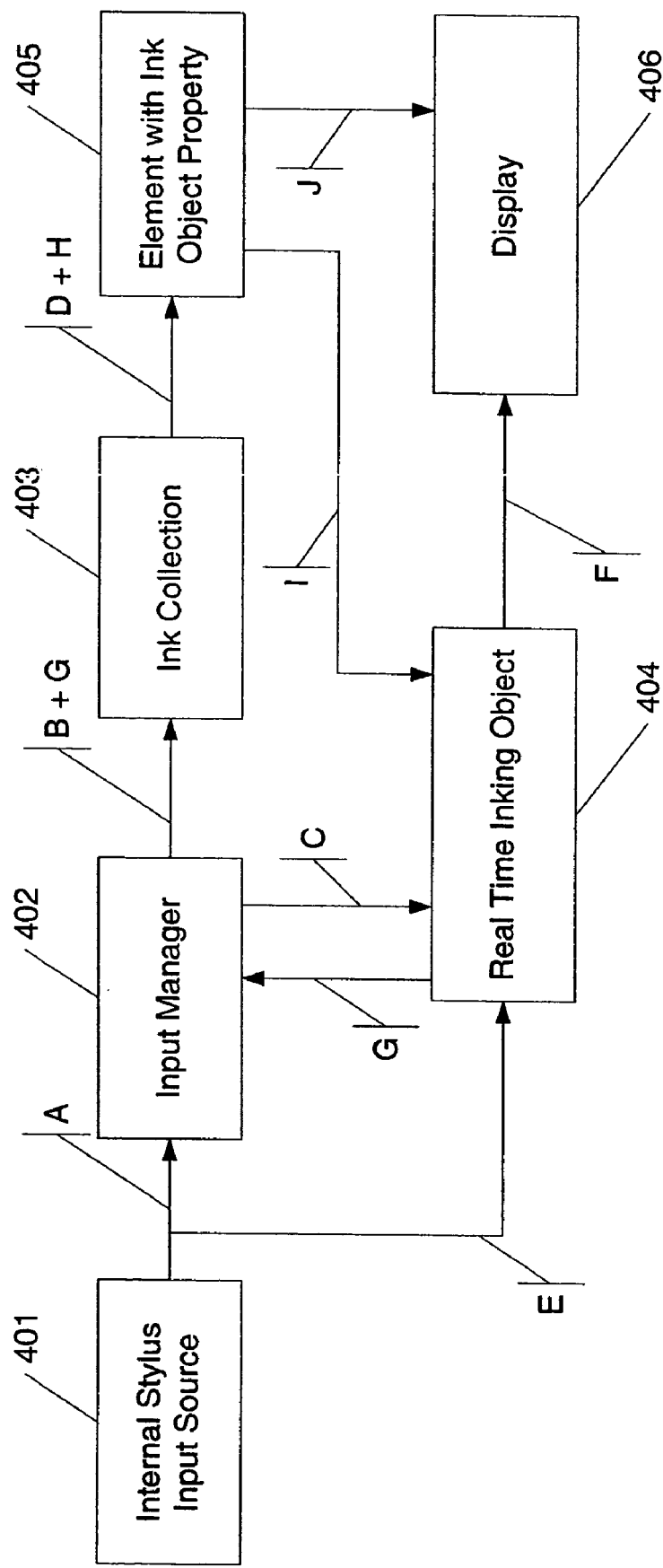
FIG. 4 shows an alternative approach for handling the flow of electronic ink in accordance with aspects of the present invention.

FIG. 4 shows an alternative approach to that of FIG. 3. FIG. 4 includes an internal stylus input source 401, an input manager 402 (which may or may not have an input queue), an ink collection object 403, and element with ink object property 405, a real time inking object 404 and a display 406.

Two types of sets of inputs may be handled: data resulting from contact between a stylus and a digitizer and data resulting from movement made above a digitizer. The movements made above the digitizer that do not contact the digitizer are referred to as "in-air stylus" inputs. The internal stylus input source separates the two sets of inputs and routes them accordingly. The following lists various actions that occur in FIG. 4:

A) An in-air stylus input event is added to an input manager 402's input queue.
B) The input manager 402 dispatches an in air stylus input to ink collection 403.
C) The input manager 402 also outputs the in-air stylus input for processing to determine if a focus change has occurred. The real time inking object 404 (also referred to as a real time stylus control) is also notified. The real time inking object 404 may request any needed data (ink color, etc.).
D) The in-air stylus event continues normal processing and continues to the element with ink object property 405.
E) Stylus "down" events are received and sent to the real time inking object 405.
F) Real time inking object 405 draws points as they are received. This may be referred to as dynamic rendering.
G) Real time inking object 405 forwards the drawn events to the input manager 402 to be dispatched at some later time as user interface threads becomes available.
H) A stroke is collected and then added to an ink object.
I) The element first notifies the real time inking object 405 to remove the dynamically drawn stroke, and then redraws the new stroke. This operation may occur based on a stroke by stroke basis or may apply on ink strokes.
J) The ink is rendered after all inking is complete.

The above approach as shown in FIG. 4 provides the benefits that ink lag is only critical for "stylus down" events. Ink lag is only perceptible while the stylus is actively drawing. All other stylus events can be delayed with little negative user impact.

The approach of FIG. 4 provide for multi-thread awareness being localized in the input manager queue and the RTI object. It also guarantees that once focus has been established there will be no lag or delay.

Object Model

Figure 5:
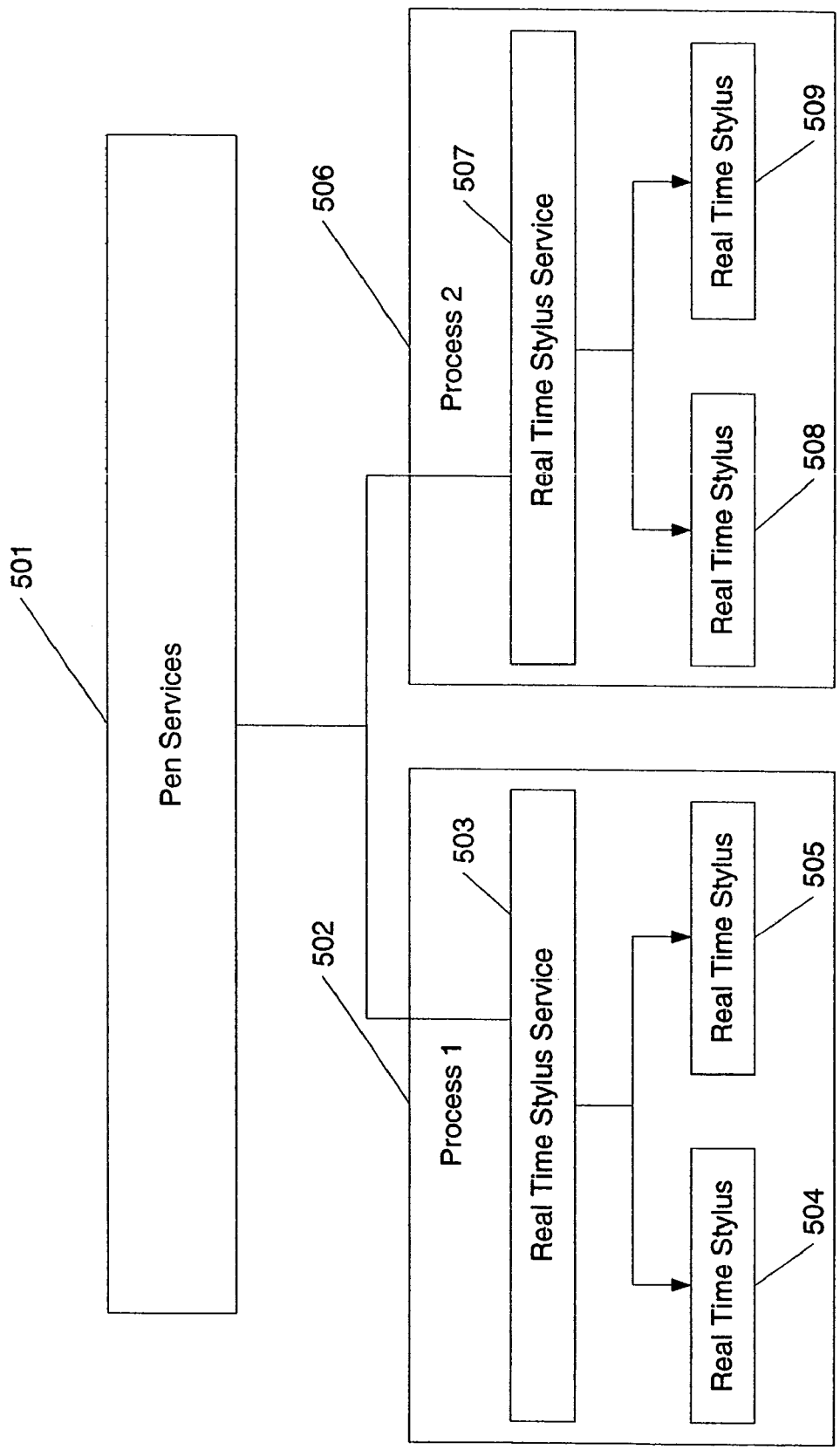
FIG. 5 shows an object mode that may support aspects of the present invention.

FIG. 5 shows various objects that may be used in combination with aspects of the present invention including five parts that may be combined to various degrees. The following lists various terms that are used in the following description:

The first part is a pen services application 501 that supports the gathering of electronic ink. An example is wisptis.exe provided from the Microsoft Corporation and used in Windows XP Tablet Edition.

Second, a real time stylus service 503 (shown associated with process 1 502) is an application that forwards stylus data from pen services 501 to the appropriate windows for collection. The real time stylus service 503 may handle an unlimited number of objects or may be limited to minimize over usage. For instance, if limited, an illustrative number of objects per thread may be 16, 32, 64, 128, and the like. Of course, other values may be used.

Third, real time styluses 504 and 505 are shown in process 1. Real time styluses 504 and 505 may receive stylus data from real time stylus service 503. Each real time stylus object may be receiving stylus data for a given section of a window or region (based on an associated window or region for that real time stylus object.

To show how multiple processes may be implemented at the same time, process 2 506 is also shown. Real time stylus service 507 may also receive stylus data from pen services 501 and forwards this information to real time styluses 508 and 509.

Figure 6:
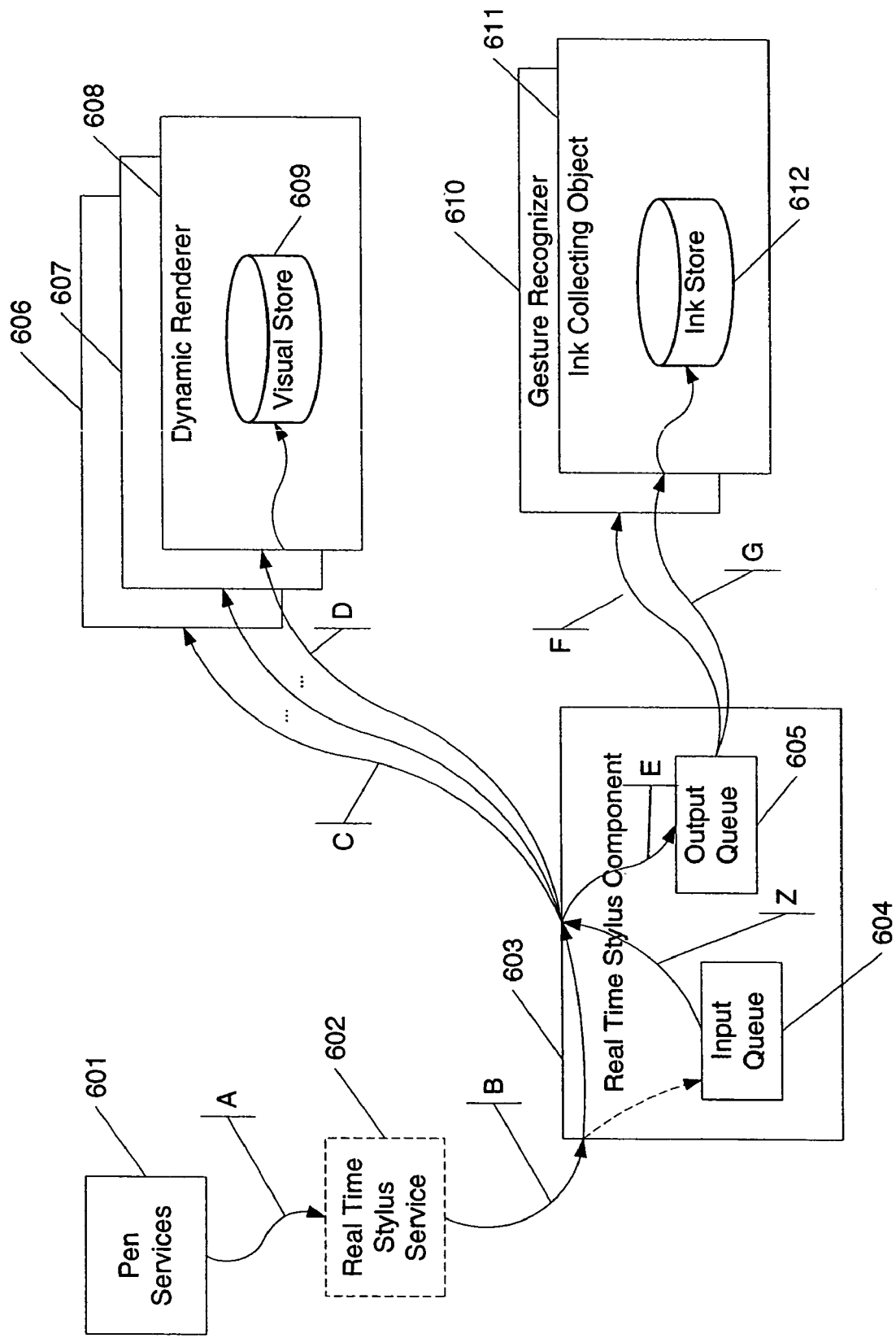
FIG. 6 shows a system for handling electronic ink in accordance with aspects of the present invention.

The real time stylus objects 504, 505, 508 and 509 are shown in greater detail in FIG. 6. The pen services component 601 forwards data to the real time stylus service 602 in data flow A. Next, the real time stylus service 602 forwards stylus data onto one or more real time stylus components 603 in data flow B. Alternatively, as shown by the real time stylus service 602 shown by dashed lines, this service may be omitted and stylus data flowing directly to the real time stylus component 603.

The stylus data received at the real time stylus component 603 may be directly fed to pluggable components 606-608. Alternatively, received stylus data may be fed into its input queue 604 for ordered processing. The real time stylus component 603 next forwards stylus data to one or more pluggable components. These components 606-608 may include a dynamic renderer 608 with a visual store that stores the currently rendered stylus data. The data flows include flows C and D.

The dynamic renderer 608 may accumulate and store packet data for one or more strokes in visual store 609. This is advantageous for instance when a stroke extends beyond an edge then reenters an inkable region while the stylus is still down. If the displayed window receives a repaint request while the pen is down, the store 609 provides the information to repaint the window quickly. If the dynamic renderer did not store stylus data in 609, the system would have to wait to repaint the window and render the most current stroke or strokes until the data made it out of the output queue and into the ink collection object 611.

The pluggable components 606-608 are class objects that may respond to certain calls through an interface to process stylus data. One example of an interface that may be used includes IStylusSyncPlugin. The combination of pluggable components 606-608 allows a developer to fully control, modify, and even delete data from the packet stream within the plug-ins. The modified packet stream from data flow E is then stored in the output queue 605.

The output of output queue 605 flows through data flows F and G to another collection of pluggable components 610 and 611. These components may include a gesture recognizer 610 and an ink collection object 611 with ink storage 612. A variety of additional plug-in objects may be tapped by data flows F and G.

The decision to separate pluggable components 606-608 from 610 and 611 may be based on a variety of criteria. For instance, components 606-608 may be synchronous plug-ins and components 610 and 611 maybe asynchronous plug-ins. Alternatively, plug-ins with shorter stylus data handing times may be handled by data flows C/D and longer stylus data handling times addressed by data flows F/G. The components from one thread C/D may be exchanged with those of thread F/G.

One advantage of separating the two sets of pluggable components 606-608 and 610-611 is that the pluggable components are handled by different threads. Here, the difference between the synchronous plug-ins and the asynchronous plug-ins lie in the thread they execute in, and the calling sequence (synchronous plug-ins may be called by the thread on which the real time stylus 603 is executing and the asynchronous plug-ins are called by normally the user interface/ application thread after the packet stream has been processed by the synchronous plug-ins and stored in the output queue 605).

In some cases, there may be public communication from the real time stylus component 603 back to pen services 601 or real time stylus service 602. In other cases, there is no public communication from the real time stylus component 603 back to pen services 601 or real time stylus service 602. Preventing communication may help the flow of data from these components.

In some situations, the real time stylus component 603 may notify the plug-ins when retrieving data by sending calls to the plug-ins in a predefined sequence. The sequence and types of plug-ins that receive these notifications may be controlled by the developer. The packet data in the events may be modified by any of these plug-ins 606-608 and 610-611.

Aspects of the present invention work with a variety of data types including packet data from pen services, notifications of changes regarding a display, tablet, pen, and the like, and other data sets that may be handled by the real time stylus. While the following description describes the use of packet data from pen services, this is but one of the many types of data that may be used with the real time stylus 603. For the following, packet data is used as an illustrative example for the data type handled by the RTS but is to be understood as referencing the more general data that may be handled by the RTS.

The real time stylus component 603 may also include queues 604 and 605. The output queue 605 may maintain all of the packet data that the time stylus component 603 processes. Once the packet data has returned from the plug-in the packet data is added to the output queue 605 from data flow E. The output queue 605 may then be used by the plug-ins (for instance, asynchronous and generally including the ink collection object 611). This may occur by extracting data out (data flow F) and building an ink object from the data held within in the output queue 605 in data flow G.

The size of output queue 605 may or may not be fixed. If fixed, after the queue 605 is full, all subsequently received data packets may be lost. If not fixed, the size of queue 605 may expand to receive additional data packets. One benefit of keeping a fixed size queue is that it limits the backlog of data to that what can be processed in a reasonable period of time. For instance, if the end-user is interacting with the system and it becomes unresponsive, it is typical for the end-user to pause until the system is once again responsive, thereby allowing the queue to process the backlog without losing data. Also, if, for some reason, a high volume of stylus data was created, queue 605 may help eliminate some of the data by having a fixed size.

The output queue 605 may be fixed in receiving data in order. Alternatively, as described below, data may be placed in output queue 605 out of sequence to maintain synchronization with real time rendering.

Input queue 604 receives information in data flow B (or if no real time stylus service 602, then data flow A) The input queue provides a process to input data to plug-ins 606-608. Alternatively, stylus data may flow directly to plug-ins 606-608. One advantage to having input queue 604 as an intermediary between data flows B and C (here as data flow Z) is that it allows created stylus data to be inserted where none exists.

The following describes a high level control flow.
  a. A real time stylus 603 concludes processing packet data as passed through plug-ins 606-608.
  b. The real time stylus 603 stores the processed packet data in the output queue 605.
  c. The real time stylus 603 looks of there are any pending packet data in the input queue 604. If there are data, then that pack data from the input queue is picked up and processed in step a above.
  d. The real time stylus 603 looks if there are any pending packet data in pen services 601. If yes, then the packet data from pen services 601 is picked up and processed in step a above.
  e. This process repeats at step c.

The following describes an alternative approach to how the real time stylus object may handle the tablet pen data. It is appreciated that the following may be applied with minor modification to FIGS. 8, 11, and 13, with the modification being the arrangement of the plug-ins on the synchronous thread (from each being daisy-chained to each being called separately by the real time stylus object).
  a. The real time stylus object 603 checks for plug-in data objects first on its input queue 604 and then from the tablet pen data stream B.
  b. The real time stylus object 603 sends C one plug-in data object to the objects 606-608 in its synchronous plug-in collection. Each synchronous 606-608 plug-in can add data to either the input queue 604 or output queue 605.
  c. Once the plug-in data object has been sent to all members of the synchronous plug-in collection, the plug-in data object is placed on the real time stylus object's output queue 605.
  d. The real time stylus object 603 then checks for the next plug-in data object to process (from input queue 604 or data stream B).
  e. While the real time stylus object's output queue 605 contains data, the real time stylus object 603 sends one plug-in data object from its output queue 605 to the objects in its asynchronous plug-in collection 610-611. Each asynchronous plug-in 610-611 can add data to either the input queue 604 or output queue 605. But since the asynchronous plug-ins may run on the UI thread, the data added to the queues 604/605 do not have a set relationship to the rest of the data in the tablet pen data stream B or to the real time stylus object's input 604 and output queues 605.

Fourth, the system includes an asynchronous plug-in 611 (represented here as an ink collection object). The ink collection object here may be representative of one or more plug-in objects. Ink collection and storage may be one of various actions that occur in the UI or asynchronous thread. Once the packet data (or modified packet data returns from the synchronous plug-ins 606-608, it is placed in the output queue 605 of the real time stylus 603. The real time stylus 603 then places the data in the output queue 605. The data is then forwarded to the next set of plug-ins 610-611 (in a collection or chain). This may include forwarding the data to the ink collecting object 611 where it may be destroyed/deleted/recycled/freed as specified by the various plug-ins on the asynchronous thread.

Fifth, the system may include standard plug-ins (which may be designed to run on either or both of the synchronous or asynchronous threads) that provide basic functionality to the system. The standard plug-ins may include a dynamic renderer 608 and a gesture recognizer 610. Of course, the standard plug-ins may be replaced with other plug-ins if desired. Further, in some implementations of aspects of the invention, no standard plug-ins may be initially included with the real time stylus. Rather, developers may be encouraged to select from third party suppliers and/or create their own plug-ins as needed.

Figure 7:
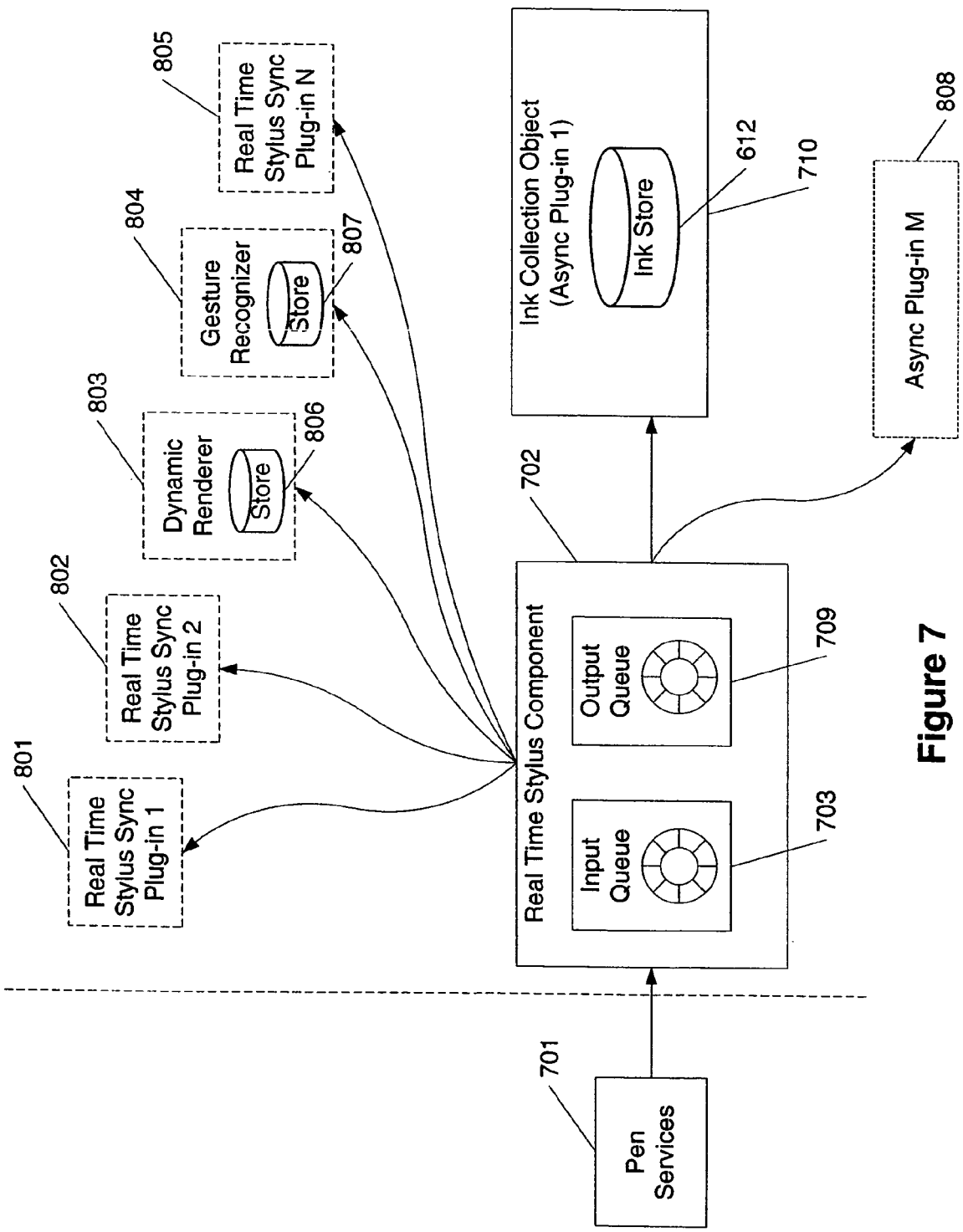
FIG. 7 shows a system for handling electronic ink in accordance with aspects of the present invention.

FIG. 7 and 8 provide an alternative version of the structure of FIG. 6. FIG. 7 shows pen services 701 providing stylus data to real time stylus 702. Input queue 703 (which may or may not be used) provides the stylus data to synchronous plug-ins 801-805. Here, each plug-in is part of a plug-in collection. Alternatively, the plug-ins may be part of a chain of plug-ins. After the last synchronous plug-in (real time stylus sync plug-in N 805), the stylus data (or modified stylus data) is placed in output queue 709 then handled by the subsequent real time stylus event asynchronous plug-ins 710 and 808.

With respect to the data of FIGS. 6 and 7, each data set as transmitted through the RTS may be a single data set or a bundle of data sets that are bundled together for efficiency since the digitizer is sampling at a very high rate. These data sets provide notifications of various events or forward new information through the RTS. In some situations, the data set may be deleted. In other situations, where the data set is a bundle of data sets, a single data set in the bundle may be deleted while retaining the other data sets. Effectively, the bundle of data sets is modified. The real time stylus 702 then may post a private message to the window to which it is attached and proceed to the next data set in the input queue (or if none, returns from the function called by pen services 701 on the pen client interface.

Figure 8A:
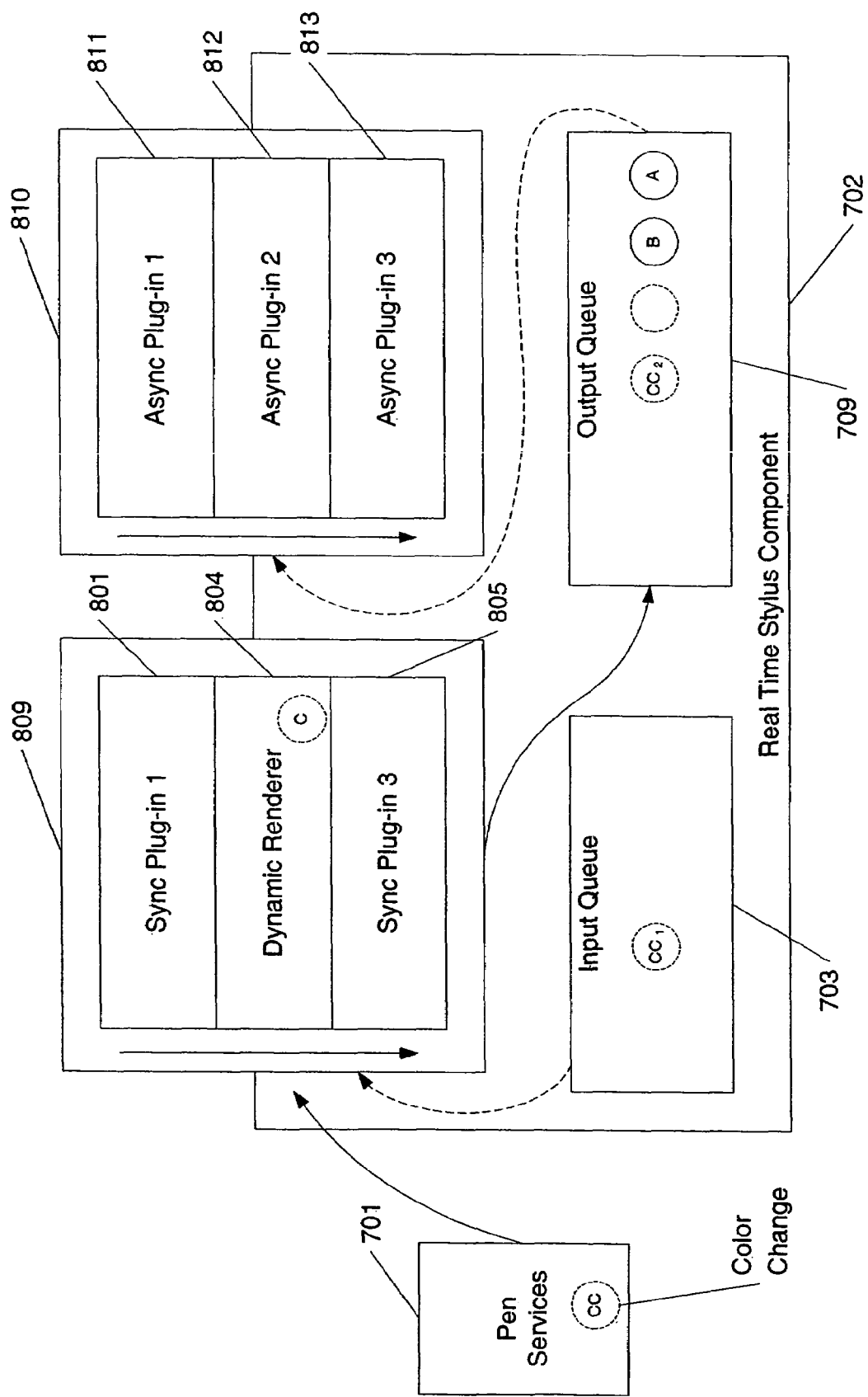
FIGS. 8A and 8B show various approaches for using an input queue and output queue in accordance with aspects of the present invention.
Figure 8B:
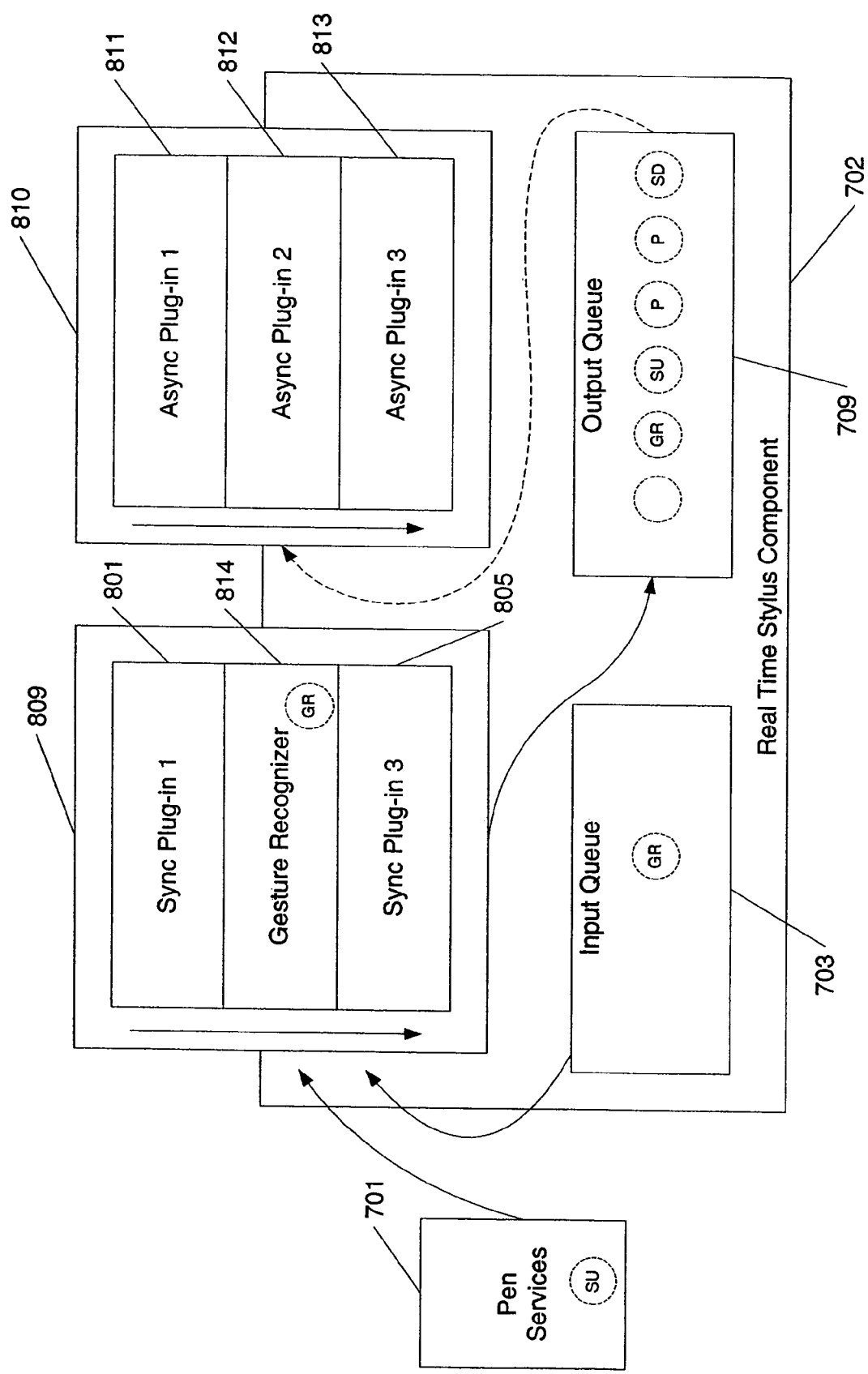

FIGS. 8A and 8B show data flows for various operations. FIG. 8A shows a color change being received in pen services 701. Real time stylus 702 includes a synchronous plug-in collection 809 and an asynchronous plug-in collection 810. the synchronous plug-in collection includes synchronous plug-in 1 801, dynamic renderer 804 and synchronous plug-in 3 805. the output from synchronous plug-in collection 809 is sent to output queue 709. Asynchronous plug-in collection 810 receives data sets from output queue 709 and processes them in asynchronous plug-ins 1-3 811, 812 and 813.

For the following description of FIGS. 8A and 8B, data packets are used. However, it is appreciated that other data sets may be used as well to convey information. Data packets are but one example of the type of data sets that may be used. Here, the real time stylus 702 has two data packets A and B in output queue 709. Data packet C is currently being processed by dynamic renderer 804 when a color change CC is received by pen services 701. The color change CC may be immediately forwarded to and processed by one of the asynchronous plug-ins. However, doing so may create a confusing situation where data packets A, B, and C were created prior to the color change. Accordingly, one may desire to process the color change only after the final processing and final rendering of data packets A, B, and C by asynchronous plug-in collection 810.

To delay the processing of color change CC, one of the synchronous plug-ins in plug-in collection 809 may create and push a data object $CC_1$ into input queue 703. Next that data object may be processed by the input queue in online with the result in color change being represented by $CC_2$ in output queue 709. Using this approach, the instruction to change a color of strokes may be properly ordered with the previously received data packets.

FIG. 8A shows an example of a color change being handled by the real time stylus component 702. However, this approach of creating objects for handling by an input queue or an output queue is helpful to process other events.

Some plug-ins (including but not limited to the dynamic renderer) may have two categories of properties, namely those where changes take immediate effect, versus those that take effect from the next stylus down (stroke start). The separation between the two categories may occur because of a variety of reasons including: technical considerations, concern for user experience and user expectations, and the like. For instance, a stroke color change may be delayed so as to preserve the order in which the strokes and events occurred from the user's perspective.

FIG. 8B shows real time stylus component 702 processing data packets and handling gesture recognition objects at the same time. Output queue 709 includes a number of data objects, including a stylus down event (SD), data packets (P), and a stylus up event (SU). When a stylus up event SU is received from pen services 701 in synchronous plug-in collection 809, gesture recognizer attempts to recognize a gesture from one or more previous data packets P. If a data packet has been recognized as a gesture, gesture recognizer 814 generates a gesture recognition object GR and places it in input queue 703. The gesture recognition of object GR is then sent through the synchronous plug-ins and routed to the output queue 709. From the output queue 709, the gesture recognition object GR is passed through the asynchronous plug-ins then destroyed/deleted/recycled/freed. A benefit of the gesture recognition object being created and passed back through the input plug-in collection 809 is that the processing allows the received gesture recognition object to be modified and/or deleted prior to being forwarded to output queue 709. Further, by having gesture recognition object GR handled by the synchronous plug-in collection 809 and asynchronous plug-in collection 810, the data packets between the stylus down and the stylus up events may be removed because they are superseded by the existence of the gesture object GR. Alternately, the events may be ignored of the data to which the gesture corresponds might still be relevant to the other plug-ins downstream. In general, the system manages which plug-ins are present when the gesture recognizer is present so that the behavior is consistent with the desired result of the developers, namely that the data that is being ignored is actually removed from a data structure after it has been placed there.

For instance, an InkCollectingObject plugin (which may build up a table of packets and then creates an ink stroke on SU) may have already created the stroke by the time the GR gets to it. So, upon receipt of the GR, the inkCollectingObject may simply delete the previously created stroke. Another plugin may then be responsible for triggering the appropriate action on the GR.

The processing of data within the synchronous and asynchronous plug-in collections allows for various handling techniques for data. If some data was relevant only to some plug-ins, other plug-ins may ignore or pass the data as needed. For example, a first plug-in may determined that data packets relate to a non-inkable the region of a display. A second plug-in may handle the data packets in a variety of ways including:

a. ignoring the notification from the first that packet,
   b. absorb the notification and nullify at such that the data packet is not passed on to subsequent plug-ins, or
   c. specify that it is not interested in the notification (for example by setting a property that indicates the extent of interest the second plug-in has in these types of packets). Here the real time stylus component may skip the second plug-in as it has specified that it has no interest in the data packet.

This third approach C offers a performance benefit by removing the overhead of a function call when none is needed.

Custom stylus data can be added to the real time stylus object by calling the AddCustomStylusDataToQueue method. If the call to the AddCustomStylusDataToQueue method is made from a synchronous plug-in in response to a call to one of its IStylusSyncPlugin methods, then the custom stylus data is added to the tablet pen data stream in a deterministic manner; otherwise, it is added in an indeterministic manner. The AddCustomStylusDataToQueue method throws an exception if the RealTimeStylus object is disabled.

Custom stylus data may be added to the real time stylus object's queues in one of three places.
   a. When the queue parameter is set to "input", the custom data is added to the real time stylus object's input queue and is sent to the synchronous plug-in collection before new data from the tablet pen data stream.
   b. When the queue parameter is set to "output", the custom data is added to the real time stylus object's output queue after the data currently being processed by the synchronous plug-in collection.
   c. When the queue parameter is set to "output immediate", the custom data is added to the real time stylus object's output queue before the data currently being processed by the synchronous plug-in collection.

In each of the above cases, data added by subsequent plug-ins in the synchronous plug-in collection is added after data added by preceding plug-ins.

Custom stylus data is added to the queue as a custom stylus data object and plug-ins receive this data through their IStylusSyncPlugin.CustomStylusDataAdded or IStylusAsyncPlugin.CustomStylusDataAdded method.

The dynamic renderer and the gesture recognizer objects may add custom stylus data to the queue.

The real time stylus object calls the IStylusSyncPlugin.CustomStylusDataAdded method on the thread from which it receives the call to its AddCustomStylusDataToQueue method.

The real time stylus object may or may not be configured to collect ink. In the event that it does not collect ink, one can use the real time stylus to forward ink data to an ink collection object. The ink collection object may be in the form of an ink collection plug-in which plugs into the output of the real time stylus.

Ink analysis or handwriting recognition is not a function of the real time stylus object. As the ink-collection plug-in collects and creates ink, or as one wants to recognize the ink, one can copy the ink to a RecognizerContext or Divider object.

As described above, ink may be displayed more than once. Ink may be displayed the first time with the dynamic renderer. Ink may be displayed the second time with a static renderer after it has been collected in an ink collection object. This may permit other types of renderers to be used to render the ink as it is received from the ink collection object. For instance, one may have multicolored ink as part of the static renderer. Pushing this set of effects to the dynamic renderer may be too intensive for the synchronous thread. Accordingly, one may create a renderer and attach it to the asynchronous thread. Alternatively, one may ignore the default dynamic renderer and create one's own dynamic renderer and plug it into the synchronous thread. One may also create a dynamic renderer which internally reuses a standard dynamic renderer through polymorphism, aggregation, or containment as used in object-oriented approaches.

One may also reuse this new renderer on the asynchronous thread as the static renderer or may create a new renderer for this purpose. For instance, one may want to render ink as if drawn with charcoal or other tip. Further, one may create a renderer that displays ink as if it was constantly changing color over time (quickly or slowly) to represent how physical ink dries. Moreover, one may create a renderer that displays ink with cycling colors (as in a rainbow) to highlight the ink. Specifically, one may create a dynamic-renderer-plug-in by creating a synchronous plug-in that subscribes to the StylusDown, Packets, and StylusUp notifications. The plug-in may then render the stroke as it is being drawn. The new renderer may handle inking as well as various selection mechanisms.

A dynamic-render plug-in is an object that displays the tablet pen data in real-time as it is being handled by the real time stylus object. Later, for events such as a form refresh, the dynamic renderer plug-in or an ink-collection plug-in may redraw the ink.

The dynamic renderer object implements the IStylusSyncPlugin interface. The dynamic renderer may additionally implement an asynchronous interface. The dynamic renderer object renders the ink in real-time, as it is being drawn. By default, when the refresh method is called, the dynamic renderer object redraws the stroke currently being collected along with any other previously-collected strokes (which would correspond to DynamicRenderer's CachedData). Other overloads of the refresh behavior are possible that include parameters to constrain the behavior of a drawing, for instance, with a clipping region so that ink is not rendered outside a given shape.

This is shown in the various figures (that the dynamic renderer object can temporarily cache ink data). When the dynamic renderer object receives a call to its IStylusSyncPlugin.StylusUp method, it caches the stroke data and adds custom stylus data to the Input queue in response to the StylusUpData object for the stroke. The CustomStylusData object's CustomDataId property is set to the DynamicRendererCachedDataGuid value, and the CustomStylusData object's Data property contains a DynamicRendererCachedData object. One may then clear the dynamic renderer's cache of the associated data once the ink has been rendered downstream. Alternatively, refreshing the ink (redrawing current strokes and data stored in CachedData) may not always clear the dynamic renderer's cache of ink strokes because those ink strokes may not yet have passed through and stored by the ink collecting object.

Figures 9, 10:
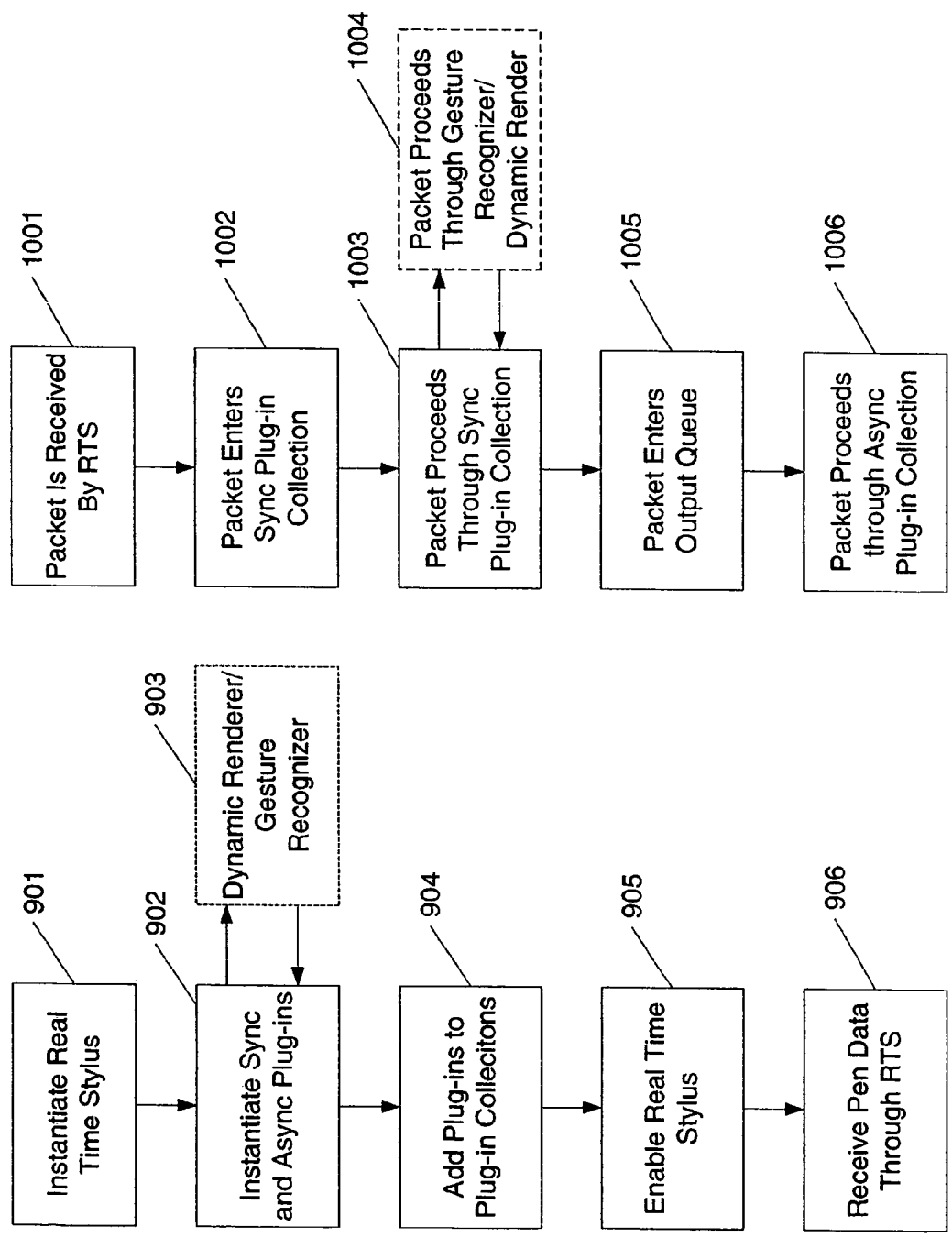
FIGS. 9 and 10 show methods for creating and using systems for handling ink in accordance with aspects of the present invention.

FIGS. 9 and 10 show processes for establishing aspects of the present system. In FIG. 9, step 901, a real time stylus component is instantiated. In step 902, synchronous and asynchronous plug-ins are instantiated. This may or may not include the instantiation of a dynamic renderer and/or gesture recognizer 903. In step 904, plug-ins are added to plug-in collections. The real time stylus is enabled in step 905. In step 906, pen data is received through the real time stylus.

FIG. 10 shows a process for using the real time stylus. In step 1001, a packet is received by the RTS. This may or may not include the operation of the input queue. The input queue supports insertion of arbitrary data at any time such that it will go through the synchronous collection. In this example, the only component putting data into the input queue is pen services, as a result of, for instance, calling a function on RTS's implementation of a pen client interface.

In step 1002, the packet enters the synchronous plug-in collection. For systems such as that of FIG. 8, this step may mean forwarding the packet to the first of the plug-ins. The real time stylus calls the function appropriate for the particular packet data on the first plug-in in the collection (or chain if a chain is present). In many cases, this component has the option of modifying the data or leaving it alone. As the component completes its operation, it calls the same function on the next plug-in object, and so on.

In step 1003, the packet proceeds through the synchronous plug-in collection (or chain). This may or may not include packets forwarded to a gesture recognizer or dynamic renderer as shown in step 1004. If a dynamic renderer is used, it may start accumulating packet data on a cursor down event (also referred to as a pen down event) in a storage and beings rendering them on a screen (the operation of the dynamic renderer). On a cursor up event (or pen up event), the dynamic renderer may clear its storage for the next cursor down event.

Figure 14:
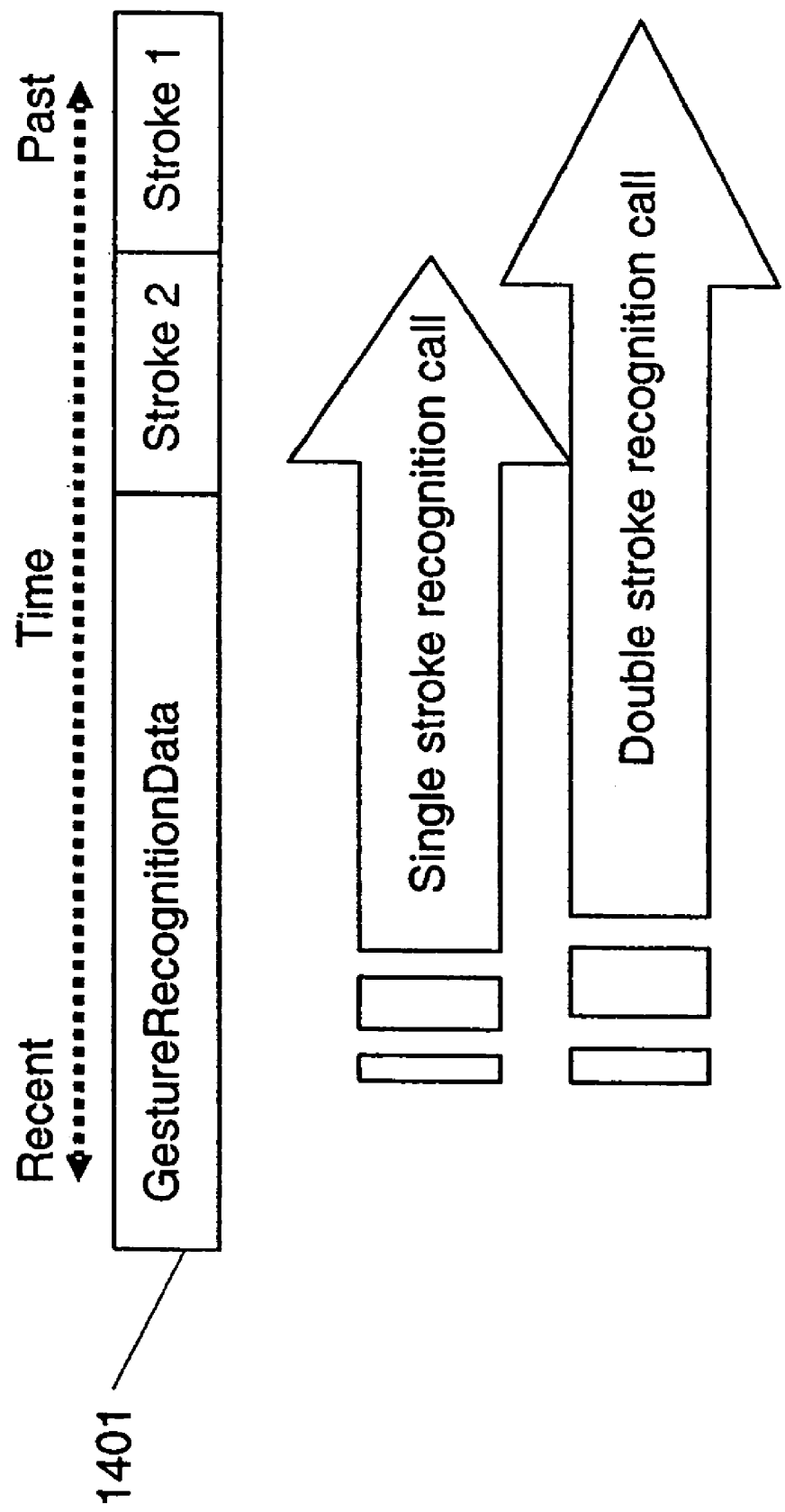
FIG. 14 shows how deep a gesture recognizer may look for gestures in accordance with aspects of the present invention.

If a gesture recognizer is used, the gesture recognizer may listen for a cursor down event and begin accumulating data in its own storage (for instance, storage 807). As strokes accumulate, the gesture recognizer passes the strokes into a recognizer and, if the strokes correspond to a desired pattern (or gesture), then a) the gesture data is added to the output queue and b) the storage is emptied and accumulation begins again with the next cursor down event passes through the queue. Here, it is noted that gestures may include one or more strokes. FIG. 14, described in greater detail below, shows how multiple stroke gestures may be handled with respect to the process of FIG. 10.

To what extent a plug-in should or can be aware of previous strokes depends on the purpose of the plug-in.

a. In one example scenario, a plug-in that is listening for a gesture might be responsible for performing an action in response to the gesture. It might not need to know anything about the strokes. For instance, if a "circle" gesture in a window means "delete" for the application, then the plug-in that receives the gesture would simply send a "delete" keystroke to the window. For this example scenario it may be that ink is not even being collected in the window; it might be a window containing text and the RTS framework may be arranged in this case to allow stroke data to simply fall through, never being collected. Thus the plug-in has no need to cache the stroke.

i. In an alternative case the "interpreter" plug-in above might generate its own notification so that downstream plug-ins would know that the gesture was interpreted and thus not persist its stroke(s).

b. In another example scenario, the plug-in might be performing ink collection and editing operations. A canonical example of this might be a mode (an ink and gesture mode) of the ink collector object where all strokes are potentially gestures, and, if they are treated as gestures, then the stroke is subsequently deleted. Thus the plug-in should cache strokes in order to be able to find and delete them should those strokes end up being interpreted as a gesture.

In both of these example scenarios, the distinction between single and multiple stroke gestures does not really matter; the application scenario may call for multiple-stroke gestures (e.g. arrow) in which case both of the example plug-ins above will be aware of multiple-stroke gestures out of necessity.

Next, in step 1005, the packet enters the output queue after being processed by the collection of synchronous plug-ins. As described previously, the collection of plug-ins may, in handling each of the objects sent to it, modify delete and/or replace the data packet. Assuming that none of the synchronous plug-ins deleted the packet, step 1005 is executed.

In step 1006, the packet proceeds through the asynchronous plug-in in collection.

Dynamic Rendering And Wet Ink

The system provides the ability to handle stylus data quickly and efficiently. To make electronic ink behave like real ink, the electronic ink needs to appear to flow as easily as real ink from the tip of a stylus. Small disruptions or delays in the flow of ink are detrimental to the electronic inking experience. The follow describes various approaches to ensuring electronic ink appears to flow smoothly from the stylus. "Wet ink" is considered the ability to control how long the dynamic renderer owns static rendering after collecting ink. To help handle the management the lifetime of ink in the dynamic renderer, a notification may be used (referred to herein as DynamicRendererCachedData) allows an ink collecting plug-in to free the cached (or wet) ink from the dynamic renderer.

A variety of different types of dynamic renderers may be created. For instance, instead of rendering ink as having been created by a fine point or chisel point pen, a dynamic renderer may render ink as having been created by translucent, water-based paint (also referred to as "water colors"). Additionally, a dynamic renderer may be created that renders ink as having been created by a charcoal stylus. Further, the dynamic renderer may render ink such that it is not fixed, but regularly changes colors and/or moves. For instance, the dynamic renderer may render ink appearing as small drops of ink or dust that coalesce into the desired ink form, as small worms that eventually move together to form desired ink, or as ink that changes color and shape.

The dynamic renderer may display ink in the same form as that later to be rendered by an object associated with an asynchronous thread of the RTS. Alternatively, a relationship may exist between the ink rendered by the dynamic renderer and final display of ink associated with the asynchronous thread of the RTS. For instance, the dynamic renderer may show ink in a first shade or shape, only to be later modified by the plug-in on the asynchronous thread to a second shade or shape. This may appear to the user as drying of ink or paint as flowing from a stylus.

The following description of dynamic rendering and wet ink may be applied to FIGS. 6-7. For purposes of explanation, FIG. 6 is referenced. The arrangement of FIG. 7 is equally applicable and the following description is desired to encompass FIG. 7 as well.

Referring to FIG. 6, digitizer input enters from pen services 601 and reaches real time stylus 603. The real time stylus passes the digitizer input through multiple synchronous plug-in objects 606-608 and stores the result into output queue 605. Objects 606-608 may be connected through an interface that describes the link between the objects 606-608, for instance, IStylusSyncPlugin. The asynchronous plug-in collection of objects 610-611 then receives the output from output queue 605 and begins to process it. For instance, ink collecting object 611 many extract digitizer input from the output queue and store it as ink. Dynamic rendering of the digitizer input occurs when real time stylus component 603 passes the digitizer input (as modified or not) through to dynamic renderer 608. Static rendering of the digitizer input (as modified or not) occurs when the digitizer input is stored in the ink storage inside of the ink collecting object 611.

One issue that may occur is where an inking surface may become invalidated after dynamic rendering 608 and prior to the digitizer input being stored inside of the ink collecting object 611. The resulting user experience would be displayed ink vanishing until the digitizer input reaches the ink collecting object 611. The user may believe he or she needs to re-create the ink and then spend time doing so, resulting in duplicate ink eventually being stored. This visual hiccup is due to the ink not being readily shown to a user or shown after a delay.

In order to avoid this vanishing ink scenario, a communication protocol may be established between the dynamic renderer 608 and ink collecting object 611. The dynamic renderer 608 may continue to cache digitizer input in visual store 609 until it is told that it can release the digitizer input by the ink collecting object 611 (for instance, when the digitizer input has been stored in ink store 612).

For purposes herein, the temporal cache 609 of digitizer input in the dynamic renderer 608 is currently referred to as cacheddata. Wet ink is the ability for the system to render ink prior to digitizer input being stored in the ink collection object 611.

Figure 11:
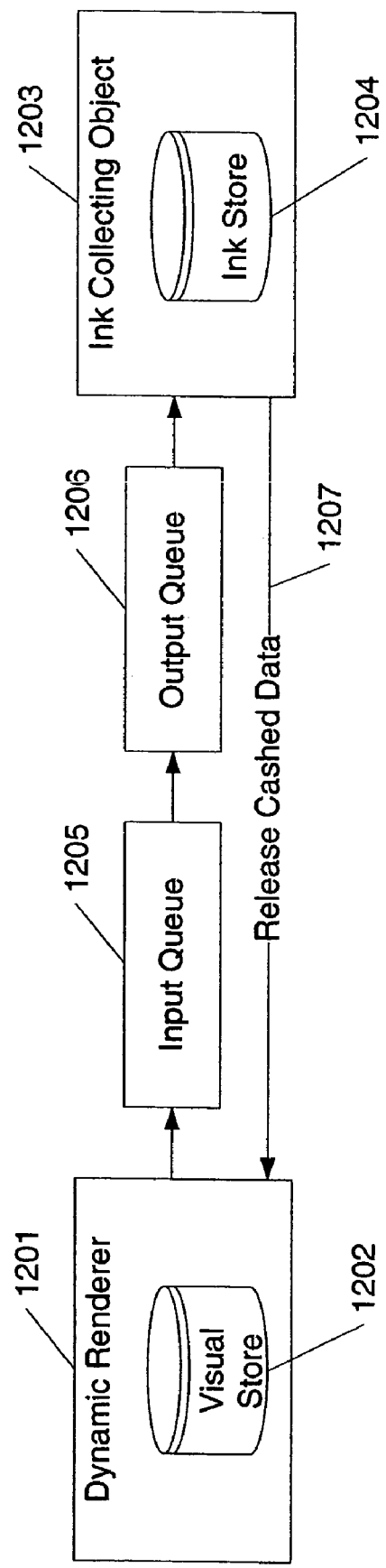
FIG. 11 shows a system with a protocol for alerting an ink collection object in accordance with aspects of the present invention

FIG. 11 shows how the ink collection object alerts the dynamic renderer to release its cached data. Dynamic renderer 1201 includes visual store 1202. Ink collecting object includes ink store 1204. Once the dynamic renderer 1201 has stored stylus data in visual store 1202, it outputs an object into the input queue 1205. The real time stylus (for instance, 702, probes the input queue for the next data to process prior to looking to the pen services 701. For purposes herein, the object injected into the input queue is referred to as DynamicRendererCachedData. The object is then picked up by the real time stylus 702 (with or without additional processing) and outputs it into output queue 1206. Meanwhile, the ink collecting object 1203 is processing the received stylus input packets in order of appearing in the output queue 1206. When the ink collecting object 1203 encounters the object from the dynamic renderer 1201 (here, the DynamicRendererCachedData object), it performs the following:

a. creates a proper correlating stroke that matches the stroke rendered by the dynamic renderer;
b. applies the drawing attributes present on the dynamic renderer stroke to the stroke to be rendered; and
c. sends a release notification to the dynamic renderer 1201. This notification may involve executing a method on the Dynamic Renderer and passing a parameter.

Step B above may or may not perform properly based on whether or not the synchronization of drawing attribute modifications have occurred prior to all strokes having been moved out of an output queue. FIG. 8A relates to a process for synchronizing drawing attribute changes with previously received data packets.

The drawing attributes may be set in the system in accordance with a developer's desires or, among other approaches, may be provided in the object passed to the ink collecting object 1203. The release notification may be a call on an interface provided by the dynamic renderer 1201. Here, the notification may be ReleaseCachedData.

Figure 12:
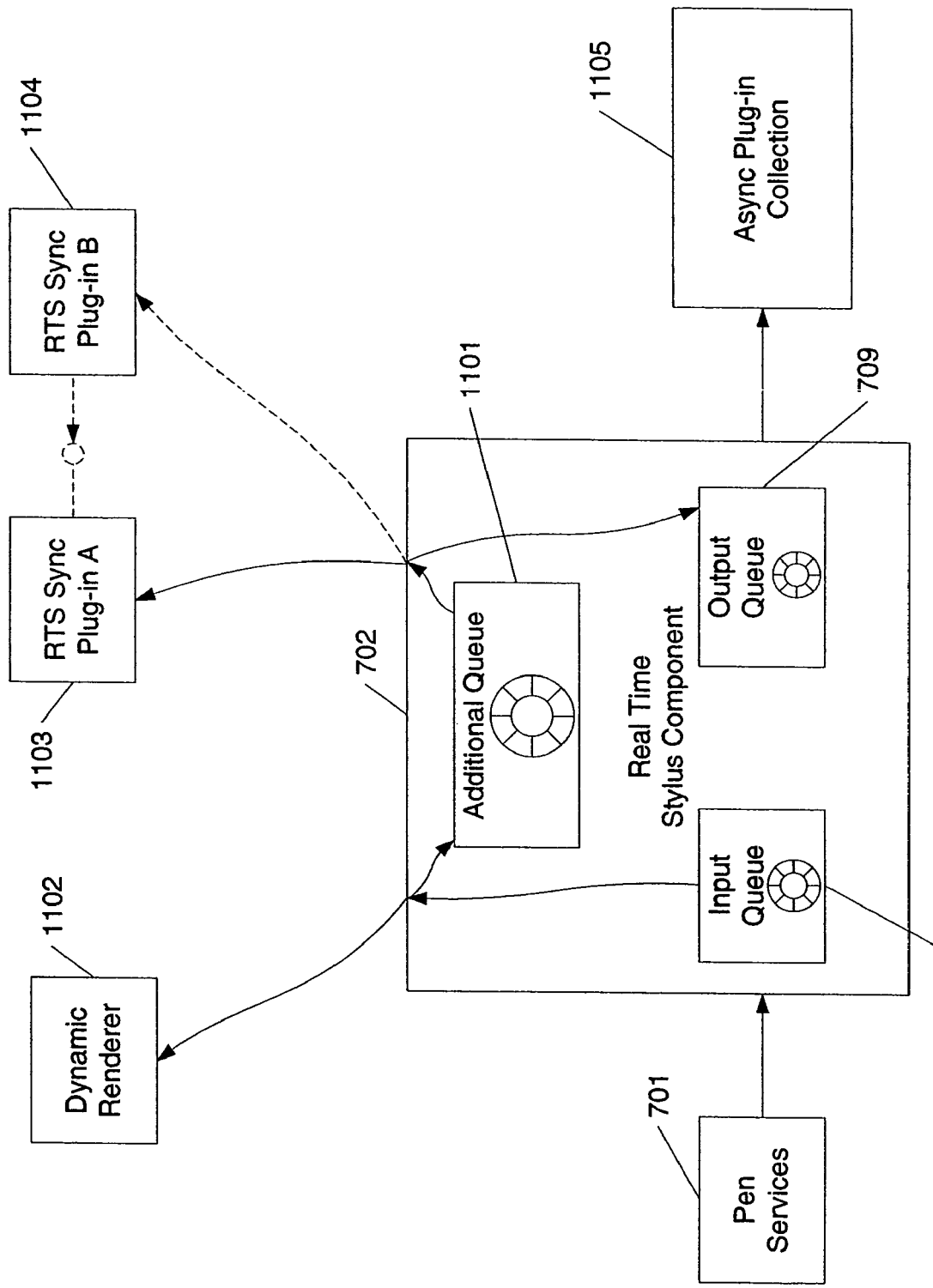
FIG. 12 shows, a system with an additional queue in accordance with aspects of the present invention.

FIG. 12 shows an alternative approach to handling wet ink. FIG. 12 includes the pen services input 701 sending stylus data to real time stylus 702. Input queue 703 may handle and queue inputs with results of real time stylus event sinks being placed in output queue 709. FIG. 12 includes an additional queue 1101. This queue handles the results from dynamic renderer 1102 which has been separated from other real time stylus event sinks A 1103 and B 1104. Here, this approach addresses the issue that may occur in which real time stylus event sinks A 1103 and/or B 1104 slow down the appearance of ink flowing from the stylus. The system of FIG. 12 handles the dynamic rendering of stylus data before it handles other event sinks A 1103 and B 1104. Even though event sinks A 1103 and B 1104 may still cause delays in the processing of stylus data on its way to the ink collection object 1105, the dynamic rendering 1102 event sink may continue to process stylus data as it is received. Here, as soon as stylus data is rendered by dynamic renderer 1102, the output is sent to additional queue 1101 where it then is accessed by real time event sinks A 1103 and B 1104. Note, the process of how real time event sinks A 1103 and B 1104 are accessed (one calling the other or both being called by additional queue 1101) can be performed through either approach.

Figure 13:
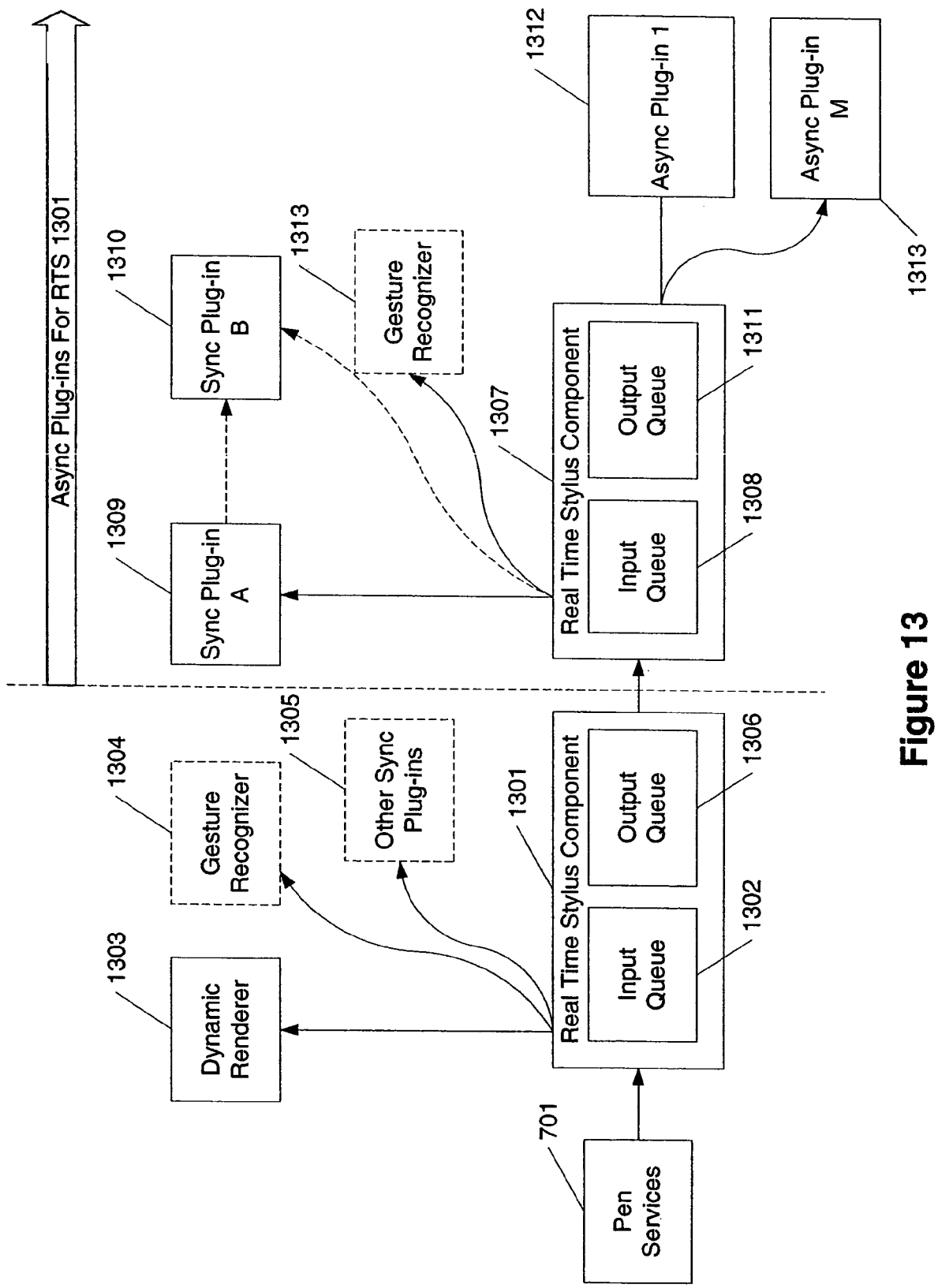
FIG. 13 shows a system with separated real time stylus components in accordance with aspects of the present invention.

FIG. 13 shows yet another aspect on how to ensure that wet ink flows from a stylus. Here, a secondary real time stylus object exists in a separate thread. Pen services 701 outputs stylus data to real time stylus component 1301. Input queue 1302 provides stylus data to dynamic renderer 1303. Other synchronous plug-ins may or may not be associated with real time stylus component 1301. Optional synchronous plug-ins include gesture recognizer 1304 and other synchronous plug-ins 1305. The output from these synchronous plug-ins is forwarded to output queue 1306. Here, real time stylus component 1307 is connected to output queue 1306 from real time stylus component 1301. The real time stylus component 1307 and its associated synchronous plug-ins 1309-1313 and asynchronous plug-ins 1312-1313 acts as an asynchronous plug-in from the perspective of real time stylus component 1301. The data packets (however modified by the synchronous plug-ins of real time stylus component 1301) are forwarded to the synchronous plug-in collection for real time stylus component 1307. For instance, the synchronous plug-in collection for real time stylus component 1307 includes synchronous plug-in A 1309, synchronous plug-in component B, 1310, and (if not used previously) gesture recognizer 1313. It is appreciated that gesture recognizer 1313 is a type of plug-in that may be associated with a synchronous thread or an asynchronous thread for any real time stylus component. Associating the gesture recognizer 1313 with the synchronous plug-in collection for real time stylus component 1307 is for illustrative purposes only.

The output of the synchronous plug-in collection of real time stylus component 1307 is forwarded to output queue 1311. Asynchronous plug-in objects 1312-1313 may then handle the data packets in output queue 1313. Again, ink is dynamically rendered and flows smoothly from the pen even when the application is blocked.

It is noted for reference that the various plug-in components may be chained together instead of following one another in a plug-in collection. An example is shown here in FIG. 13 where synchronous plug-in component A 1309 is chained to synchronous plug-in component B 1310. Of course, the approaches of chaining plug-in components together or collecting them in a collection may be used in alternatively or in addition to each other for addressing plug-in components in accordance with aspects of the present invention Gesture Recognition Gesture recognition attempts to determine if a gesture has been made and handles it appropriately. Gesture recognizer 610, for example, is responsible for looking at digitizer input, and injecting gesture recognition results into the input queue similar to the dynamic renderer 608. FIG. 8B described how gesture recognition may be performed with synchronous and asynchronous plug-in collections. That description is relevant with respect to the operation of the gesture recognition object.

The gesture recognizer 610 may use an algorithm. Here, the gesture recognizer may use a permutation algorithm to recognize multiple-stroke gestures. For instance, when a property relating to the maximum number of strokes has been set, the gesture recognizer looks back that many strokes. For instance, if the property is set to 2, the gesture recognizer looks back to the most recent 2 strokes trying to recognize them as gestures. This may result in multiple recognition calls. However, this approach eliminates a constant delay for having to wait for a gesture recognizer to start processing after the last stroke.

FIG. 14 shows an example of how far back a gesture recognizer looks back to obtain parts of a gesture. The results may be stored in an object (here, for instance named GestureRecognitionData). The results may be injected into the real time stylus input queue.

Once the ink collecting object 611 receives the gesture object (here, GestureRecognitionData), it removes the strokes for the gesture from the ink store 612 and conducts the appropriate actions in response to the gesture.

As described above, to perform gesture recognition, the system may add a SystemGestureData object to the Input queue in response to the data that finishes the gesture, such as a StylusUpData object for the Tap gesture.

The gesture recognizer may be implemented as an object with various interfaces. For example, the gesture recognizer object may implement IStylusSyncPlugin and IStylusAsyncPlugin interfaces.

When the gesture recognizer object recognizes a gesture, it adds custom stylus data to the Input queue in response to the StylusUpData object for the stroke. The CustomStylusData object's CustomDataId property is set to the GestureRecognitionDataGuid value, and the CustomStylusData object's Data property contains a GestureRecognitionData object.

a. By passing the stroke information to an existing Recognizer object and using the AddCustomStylusDataToQueue method to add the results to the pen data stream.

b. By performing the recognition within a custom plug-in and using the AddCustomStylusDataToQueue method to add the results to the pen data stream.

c. By wrapping a standard gesture recognizer plug-in with a custom plug-in that calls the standard plug-in in a daisy-chained fashion. In this way a developer may implement in-air gesture recognition, by "translating" in-air-packets into Packets, Cursor-In-Range into StylusDown, and CursorOutOfRange into StylusUp.

The real time stylus object receives data about system gestures as they are recognized by the system. The following table describes where the SystemGestureData objects occur in the pen data stream in relation to other pen data. The following list is illustrative and not exhaustive. Other gestures may be used in conjunction with aspects of the present invention without departing from the scope of the invention.

SystemGesture Description

| | |
|---|---|
| Tap | After the StylusDownData object, and before the StylusUpData object. |
| DoubleTap | After the StylusDownData object, the SystemGestureData object for the Tap system gesture, and the StylusUpData object, and before the second StylusDownData object. |
| RightTap | After the StylusDownData object and the SystemGestureData object for the HoldEnter system gesture, and before the StylusUpData object. |
| Drag | After the StylusDownData object, and before the StylusUpData object. |
| RightDrag | After the StylusDownData object, and before the StylusUpData object. |
| HoldEnter | After the StylusDownData object, and before the StylusUpData object. This system gesture isn't recognized if the user begins a Drag or RightDrag system gesture. |
| HoldLeave | Optional |
| HoverEnter | After several InAirPacketData objects of low average velocity. There may be noticeable delay before receiving the HoverEnter system gesture. The real time stylus object only receives this data if the real time stylus object is attached to the window or control that is directly under the pen at the time of the system gesture. |
| HoverLeave | After the SystemGestureData object for the HoverEnter system gesture and several InAirPacketsData objects of sufficient average velocity. There may be noticeable delay before receiving the HoverLeave system gesture. The real time stylus object only receives this data if the real time stylus object is attached to the window or control that is directly under the pen at the time of the system gesture. |

By default, the gesture recognizer object only recognizes single-stroke gestures. The gesture recognizer object can be set to recognize multistroke gestures (see FIG. 14, for instance). For multistroke gestures, the CustomStylusData object is added to the Input queue in response to the StylusUpData object for the final stroke of the gesture. When recognizing multistroke gestures, one may receive notifications for overlapping sets of strokes. For example, the first and second strokes together may be recognized as one gesture, the second stroke by itself may be recognized as a gesture, and the second and third strokes together may be recognized as another gesture.

If one is using the gesture recognizer object for multistroke gesture recognition, one may use a cascaded real time stylus model and attach the gesture recognizer object to the secondary real time stylus object in order to reduce delays on the real-time thread but prevent gesture recognition from being affected by delays on the user interface thread.

Further, one may create a custom gesture recognizer plug-in that recognizes handwriting, gestures, or other objects in three ways.

Synchronous And Asynchronous Processes

When a real time stylus instance is instantiated, an execution thread may be instantiated. The execution thread may be separated into synchronous objects and asynchronous objects. The synchronous objects generally operate in synchronization with packets originating from a pen services component. The asynchronous objects are generally grouped as objects that do not have to be always executed in syncretism with ink strokes and or other data packets originating from pen service components. The separation of these two threads permits a dynamic renderer object to-quickly handle data packets in synchronization with the receipt of the data packets and permits other plug-in objects which, while still important, may be handled correctly even with a slight delay from the or receipt of the original data packets.

The collection of synchronous plug-ins are executed on this new thread that was instantiated for the real time stylus instance. The collection of asynchronous plug-ins may be executed in a user interface thread.

The real time stylus thread may be intended for computationally light activities so that inking (packet queuing and dynamic rendering) is generally responsive and smooth. Therefore, only computationally light processing should generally be implemented with the thread with for the synchronous plug-ins.

The user interface thread (usually associated with the output of the output queue) is usually used by asynchronous plug-ins that require computationally intensive activities. To assist, a queue architecture is provided between the real time stylus thread and the user interface thread to be robust against temporary blockages in the user interface (UI) thread. The UI thread may or may not be the final destination of packets and other data collected on the real time stylus thread. It is noted that alternative architectures may handle computationally intense activities better, thereby not readily forcing a developer to compromise between blocking a pen thread and a user interface thread. For instance a cascaded design as described herein allows the separation of threads to better handle different activities.

The gesture recognizer may be implemented on the synchronous thread or may be implemented on the asynchronous thread if the gesture recognizer is determined or anticipated to be slow from expected heavy gesture recognition activities (e.g., a large number of accepted gestures to which strokes are going to be compared against). The gesture recognizer object may have both a synchronous plug-in interface and an asynchronous plug-in interface to give a developer the flexibility to utilize the object from either or both threads. This capability is not limited to the gesture recognizer. The queues. It is appreciated that all plug-ins may or may not have a synchronous interface, an asynchronous interface, or both in order to allow a developer to place the plug-in in asynchronous collection or in an asynchronous collection or both if the plug-in supports this, depending where the developer anticipates a good location for the plug-in to be.

The real time stylus object provides real-time access to the tablet pen data stream and may run on its own thread. Synchronous plug-ins may or may not generally run on the real time stylus object's thread, while asynchronous plug-ins may or may not generally run on the application's user interface (UI) thread. One may separate the synchronous thread from the asynchronous thread by placing plug-ins for tasks that require real-time access to the data stream and are computationally light, such as dynamic rendering, on the synchronous thread. Plug-ins for tasks that do not require real-time access to the data stream, such as ink collection, may be placed on the asynchronous thread.

Certain tasks may be computationally intensive yet still require close to real-time access to the tablet pen data stream, such as multi-stroke gesture recognition. Plug-ins to handle these tasks may be grouped on one thread or the other or may be part of cascaded real time stylus objects as shown in FIGS. 12 and 13.

Cascading

Real time stylus instances are, in many ways, a thread host that encapsulates extensibility and policy. FIG. 13 shows an example of how multiple synchronous threads may work together. Gesture recognizer may be placed on the synchronous thread at location 1304 or may be placed on the synchronous thread at location 1313.

If there were multiple functionalities that the developer wants to connect in a multi-threaded manner, the developer can cascade multiple real time stylus instances and plug their functionality in as synchronous plug-ins.

The specific scenario that suggests this feature is to realize 'truly uninterruptible' inking. The gesture recognizer may at times cause significant latency to obtain recognition results when the developer is interested especially in multi-stroke gestures. Therefore, the gesture recognizer may not be on the synchronous collection of real time stylus where the dynamic renderer is positioned, as it has a potential to block dynamic rendering. The gesture recognizer may be also located with the ink collection object with the collection of asynchronous plug-ins.

The system as shown in FIG. 13 is beneficial where one wants to separate computationally intensive operations from the gesture recognizer or other threads for operations including, such as, accessing a database, posting to web server, refreshing a screen, and the like. Where gesture recognition is an integral part of the 'truly uninterruptible' experience, one may have the gesture recognizer run on its own thread, namely a second real time stylus thread.

Real time stylus may support this usage by implementing an asynchronous interface, thus allowing it to behave as a mere asynchronous plug-in instance. The following describes how a real time stylus may be added to another real time stylus. The following provides a number of options that may or may not be implemented.

1. When a real time stylus is added to the collection of asynchronous plug-ins, the system may limit relationships such that no other asynchronous plug-in interfaces may be added.
2. Different numbers of real time stylus objects may be cascaded along multiple dimensions. For instance, multiple RealTimeStylus objects could be connected directly to a single "parent" RealTimeStylus, or alternatively the multiple RealTimeStyluses could be connected in series such that each cascades into the next, or alternatively the RealTimeStylus objects could be connected in a combination of the aforementioned configurations. An implementor could choose to constrain these combinations for simplicity or reliability.
3. When the same real time stylus instance is added to multiple collections of asynchronous plug-ins from multiple real time stylus parents, the cascading real time stylus may function as normal. Alternatively, the cascading (child) real time stylus instance may stop functioning and insert an ErrorData object into the queue. The ErrorData object may be an indication to downstream objects that there is an error in the data or that a previous plug-in encountered an error while processing the data. Of course, this is but one approach to handling errors. Other approaches may be used as well.

It is noted that, while one implementation may re-use an asynchronous plug-in collection as a collection point for cascading, an alternate implementation may have a dedicated connection point for connecting a cascaded RTS, thereby allowing each RTS in the cascade to have its own independent set of synchronous and asynchronous plug-ins.

It is appreciated that the existence of the ErrorData object may be independent from cascading. So, the generation of the ErrorData object may occur with respect to a single real time stylus component as well as with cascaded real time stylus components.

Dynamic Plug-In Collection Modification

The synchronous and asynchronous plug-in collections on the real time stylus may be modified without disabling and then re-enabling the real time stylus for performance benefits. Thus, there is no assurance that there is an 'enabled' or 'disabled' operation done at the real time stylus scope.

In order to ensure a timing where plug-ins can initialize & clean-up, 'artificial' (meaning not resulting from true client code calls to enable & disable) RealTimeStylusEnabled &

RealTimeStylusDisabled calls may be made to plug-ins which are dynamically inserted or removed from the plug-in collections.

The following describes some of the behaviors that may occur when adding or removing plug-ins.

When a plug-in is added to an enabled real time stylus instance, an artificial RealTimeStylusEnabled call may be made to this plug-in;

When a plug-in is added to a disabled real time stylus instance, nothing may happen;

When a plug-in is removed from an enabled real time stylus instance, an artificial RealTimeStylusDisabled call may be made to this plug-in; and When a plug-in is removed from a disabled real time stylus instance, nothing may happen.

The way these relationships are maintained may or may not include incrementing a counter each time it gets a real time stylus enabled call. Every time it gets a real time stylus disabled call, this counter is decremented. When the counter is 1, this plug-in functions. When the counter becomes larger than 1, this plug-in raises an exception and inhibits its functionality. When the counter comes back down to 1, this plug-in stays disabled. The plug-in only re-enables itself when the counter is back down to 0 again. Other approaches may be used.

Error Propagation

Design Time

While in a development environment (for instance, Visual Studio.NET by Microsoft Corporation) developers may break at any Exception that is raised regardless of whether it is caught or not with a try catch. Therefore, error reporting is straightforward for the purpose of detecting invalid configurations of the RealTimeStylus framework.

Run Time

The error reporting/propagation issue may become difficult for run time errors, as real time stylus and synchronous plug-ins are running on the real time stylus thread (ink thread) which is different from the UI thread (app thread). If a synchronous plug-in were to raise an exception, it can be caught by the real time stylus but the exception has no where to go beyond that since it is on the real time stylus thread (ink thread), and the origin of the control flow is the real time stylus. Propagating the error to the user interface thread and allowing the client code to gracefully deal with the error may be difficult. The following describe a solution.

The .NET standard error handling is to fire events from the plug-ins when exceptions occur, and have the developer's error handling code in the UI thread listen to this event. This does not work for Real Time Stylus though since when a plug-in fires an event, there is a possibility that the data that caused the exception may not have reached the UI thread due to the queuing. It is challenging to conduct graceful error handling without the availability of the context (namely the bad data as well as preceding and succeeding data) in which the exception occurred to the error handling code. This approach is only good for simplistic error handling such as raising an error dialog and terminating the application.

The proper places to conduct error handling within the real time stylus framework is in the plug-ins (synchronous or asynchronous), as the plug-in is the only code blocks that are under the developer's control.

The real time stylus thread (ink thread) should not immediately stop functioning on an exception raised from a synchronous plug-in as this makes it impossible to conduct error handling in the UI thread (app thread) (e.g. the queues need to stay intact for error handling). Furthermore, what one plug-in considers invalid input may be completely valid for another plug-in.

Figure 15:
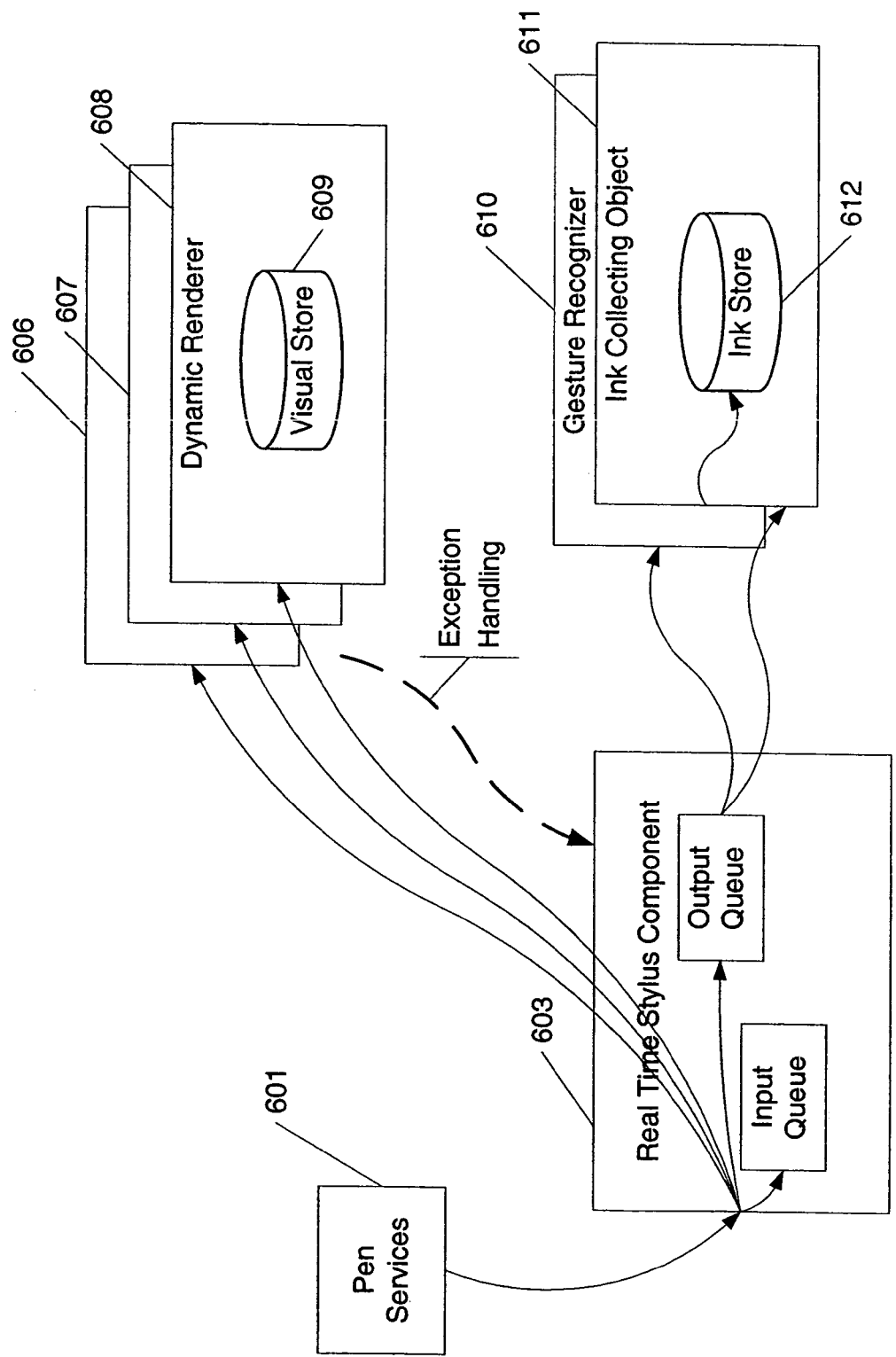
FIG. 15 shows a system for exception handling in accordance with aspects of the present invention.

FIG. 15 shows a possible solution. Here, exception information is re-routed through the queues as an ErrorData object. Error handling may be conducted in plug-ins. The exception information may be processed through the data flow created for plug-ins, namely the queue.

As shown in FIG. 15, the real time stylus 603 catches all exceptions coming from plug-ins 606-608 and creates an ErrorData object. The following shows a process for identifying errors:

a. If the exception occurred in the error method on the interface for the synchronous or asynchronous plug-ins, no ErrorData object is created to avoid infinite loops by calling back into the exception origin plug-in.
  i. An alternative approach is to immediately pass the ErrorData object through the remaining plug-ins in the collection, prior to the actual data that caused the exception.
b. If the exception occurred in other methods on the interface for the synchronous or asynchronous plug-ins methods, the ErrorData object may be immediately passed to the exception origin plug-in itself first, and then passed through the remaining plug-ins in the collection, prior to the actual data that caused the exception.
c. The ErrorData is eventually queued in the output queue if the exception occurred in the synchronous plug-ins, or delivered to asynchronous plug-ins.
d. After the ErrorData is through the collection, the data that caused the exception passes through the remaining plug-ins in the collection.

The ErrorData object may be passed through the plug-in collection through dedicated methods (for instance, IStylusSyncPlugin.Error method or IStylusAsyncPlugin.Error method).

More particularly, when a plug-in throws an exception, the normal flow of data is interrupted. The real time stylus object generates an ErrorData object and calls the IStylusSyncPlugin.Error or IStylusAsyncPlugin.Error method of the plug-in that threw the exception and the IStylusSyncPlugin.Error or IStylusAsyncPlugin.Error method of the remaining plug-ins in that collection. If the plug-in that threw the exception is a synchronous plug-in, the ErrorData object is added to the output queue. Then real time stylus object resumes normal processing of the original data.

If a plug-in throws an exception from its error method, the real time stylus object catches the exception but does not generate a new error data object. Alternatively, a new error data object may be produced depending on the implementation or desire of the developer. In this alternative approach, the real time stylus may then reduce any created loop by limiting the number of recursions or it may ignore the risk altogether.

In relationship to custom stylus data added by synchronous plug-ins, the error data is added to the output queue after any custom stylus data that is added to the "output immediate" queue prior to the exception that created the error data and before any custom stylus data that is added to the "output immediate" queue by subsequent plug-ins in the synchronous plug-in collection. If any of the synchronous plug-ins adds custom stylus data to the "output immediate" queue in response to the error data, the data is added immediately before the error data. If any of the synchronous plug-ins adds custom stylus data to the output queue in response to the error data, the data is added immediately after the error data.

The real time stylus object calls the IStylusSyncPlugin.Error method on the thread from which the exception is thrown.

Managed/Unmanaged Illustrations

Figure 16:
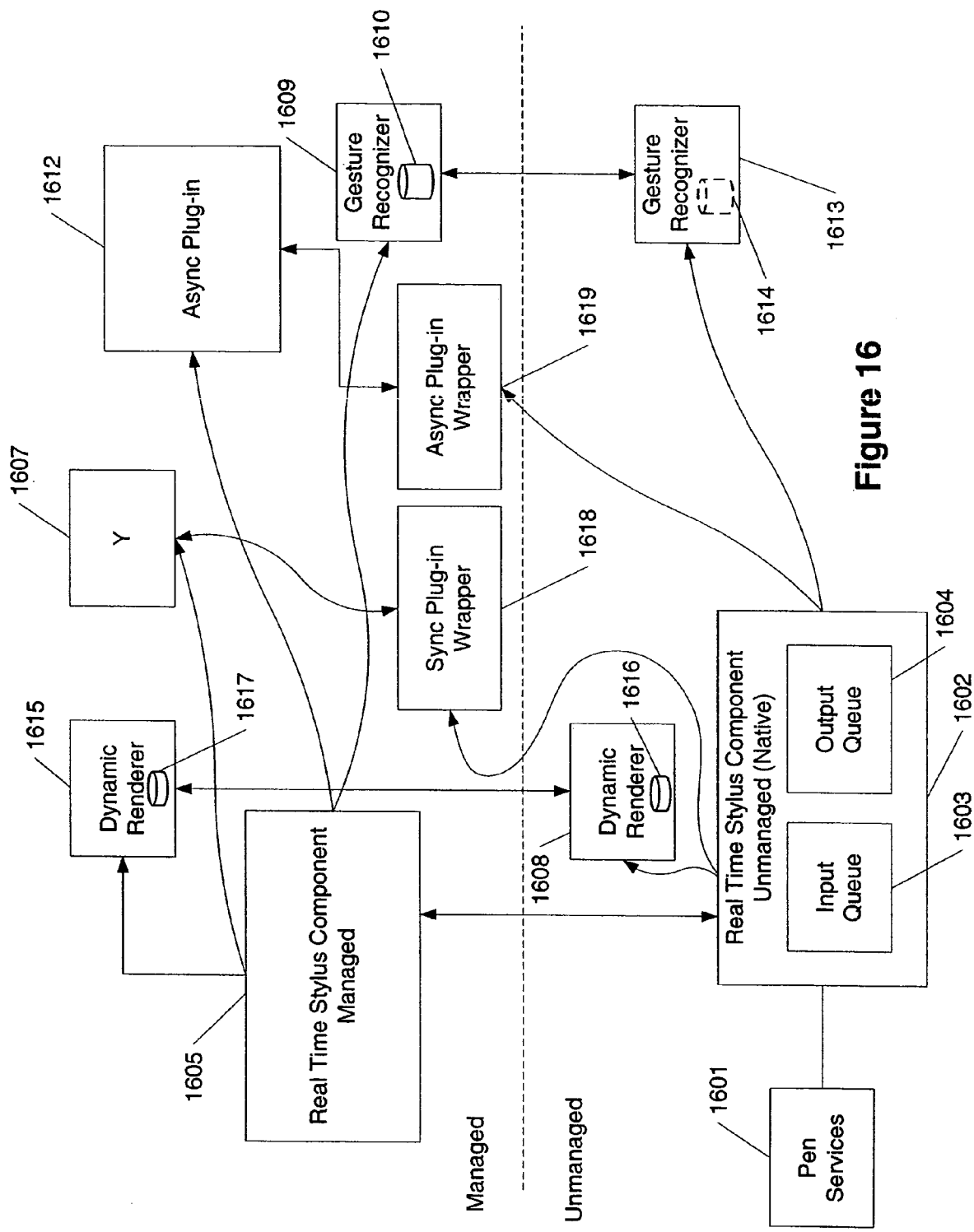
FIG. 16 shows managed and unmanaged code in accordance with aspects of the present invention.

FIG. 16 shows various approaches to implanting aspects of the present invention. The system may include COM objects wrapped by a collection of C# managed objects. Alternatively, any object orient language may be used including Java, C++, and the like.

FIG. 16 shows a real time stylus component existing in both managed and unmanaged space. FIG. 16 includes a dynamic renderer, asynchronous plug-in Y, an asynchronous plug-in and a gesture recognizer.

Pen services 1601 sends stylus data to real time stylus component 1602 with its input queue 1603 and output queue 1604 in the unmanaged code region. Stylus data is passed to the real time stylus component 1605 in the managed code region.

The dynamic renderer is the first synchronous plug-in attached to the real time stylus component. In the unmanaged space, the dynamic renderer 1608 with its data cache 1616 is attached to the real time stylus component 1602. Similarly in the managed space dynamic renderer 1615 with its data cache 1617 is part of the synchronous plug-in collection for real time stylus component 1605. The next synchronous plug-in in the synchronous plug-in collection is synchronous plug-in 1607. Synchronous plug-in 1607 follows after dynamic renderer in synchronous plug-in collection for the RealTimeStylus component 1605. Because synchronous plug-in Y 1607 only exists in managed space, a synchronous plug-in wrapper 1618 allows the unmanaged RealTimeStylus component 1602 to access synchronous plug-in 1607 over the managed/unmanaged boundary.

FIG. 16 also shows a collection of asynchronous plug-ins. The asynchronous plug-ins include a synchronous plug-in 1612 and gesture recognizer 1609. Asynchronous plug-in 1612 is the first asynchronous plug-in in the asynchronous plug-in collection attached to RealTimeStylus component 1605 in managed space. Because asynchronous plug-in 1612 is in managed space, asynchronous plug-in wrapper 1619 may be used to allow access to it from the unmanaged RealTimeStylus component 1602. The gesture recognizer exists both in managed space and unmanaged space. The managed gesture recognizer 1609 with its data cache 1610 is the next plug-in accessed after asynchronous plug-in 1612. Gesture recognizer 1609 may exchange information with the unmanaged version of the gesture recognizer (1613 with its data cache 1614).

Data crossing between the managed and unmanaged sides of FIG. 16 may need to be converted or "marshaled" between the structures used in unmanaged space and structures used in managed space. The .NET Framework by Microsoft Corporation provides an interoperability layer that performs much of this marshaling automatically. This additional data processing incurs an implied performance penalty, so the design as shown in FIG. 16 is tuned to minimize the number of interoperability layer crossings.

The relationship between managed wrapper for RTS 1605 and unmanaged RTS 1602 is that to the native (unmanaged RTS 1602), the managed RTS 1605 looks like another RTS event sink. When instantiated with dynamic renderer 1615 in its constructor, the RTS 1605 accesses the corresponding unmanaged dynamic renderer 1608 and hooks it in to synchronous plug-in collection after itself The managed gesture recognizer object 1609 may be a full implementation of an asynchronous plug-in. It accumulates packet data on the managed side and marshals it across the interoperability layer, and passes into the unmanaged code implementation 1613. The return code is whether packets correspond to a gesture or not.

The managed and unmanaged dynamic renderer objects 1615 and 1608 are also shown in FIG. 16. The managed dynamic renderer object may be a thin wrapper over the properties of the unmanaged dynamic renderer 1608. The managed dynamic renderer 1615 is optional. If the dynamic renderer 1615 is not instantiated here, it may be instantiated as one of the other synchronous plug-ins.

The following is a process for creating the system of FIG. 16:

a. First, a developer instantiates the managed asynchronous plug-in 1612 and managed dynamic renderer 1615. Internally, dynamic renderer 1615 instantiates an unmanaged dynamic renderer 1608 in order to pass property settings down.

b. Second, a developer sets properties on the dynamic renderer 1615 (drawing attributes, etc).

c. Third, a developer instantiates real time stylus 1602, handing the dynamic renderer 1615 in the real time stylus constructor. A few things may happen internally:
   i. Managed real time stylus 1605 queries (via public sealed accessor) the address of the unmanaged dynamic renderer 1608.
   ii. Managed real time stylus instantiates a native real time stylus 1602, which hooks itself to pen services 1601.
   iii. Managed real time stylus 1605 hooks itself to the native real time stylus 1602 as a real time stylus event sink.
   iv. Managed real time stylus 1605 hooks the native dynamic renderer 1608 to its synchronous output.
   v. Managed real time stylus 1605 hooks itself to the native real time stylus 1602 synchronous plug-in thread.

d. Fourth, the developer instantiates one or more managed synchronous and/or asynchronous plug-in objects, optionally including the managed gesture recognizer 1609.

e. Fifth, the developer collects the managed plug-in objects together, into various plug-in collections. (This may be done by informing the RealTimeStylus components of the order in which the plug-ins should be accessed. Alternatively, for chaining the plug-ins together, one may set a property and in this reference to the first plug-in.)

f. Sixth, the developer associates the managed asynchronous plug-in object 1612 with the managed real time stylus 1605 InkCollectionObject property (thus hooking the asynchronous plug-in object 1612 to the asynchronous plug-in collection of).

g. Seventh, the developer sets RTS.Enabled to "true". This may also cause the managed real time stylus 1605 to set the IRealTimeStylus→Enabled to "true" on the native real time stylus 1602.

h. Eighth, events begin streaming in through real time stylus 1602.

Step (c) may be realized with an alternative arrangement. For instance, the API may not have any plug-in specific accommodations on the RTS constructor. Instead, the various overloads of the RTS constructor dictate how the RTS itself will be used (e.g. attached to a window or control, associated with one or many digitizers, mouse verses pen behavior, etc. The DynamicRenderer parameter may be used because of performance implications of data crossing the interop boundary multiple times. As a result DynamicRenderer may be used in an architectural sense to be the first or last synchronous plug-in in the plug-in collection or chain.

FIG. 16 shows an approach of an architecture that minimizes the interop crossings and allows the DynamicRenderer to be anywhere in the ordered list of plug-ins.

The following describes a process for using the system of FIG. 16:

a. Pen service 1601 calls a function on RTS 1602, passing data which is accumulated into the synchronous plug-in collection associated with RealTimeStylus component 1602. In some cases, data from input queue 1603 may also be passed into the plug-in collection.

b. Native RTS 1602 does the following when new data appears in the input queue 1603 (or when the appropriate method is called on the interface it exposes to pen services 1601):
  i. transform packets from digitizer space into himetric ("ink space");
  ii. embed the inverse transform (himetric→digitizer) in the packet data; and
  iii. pass the transformed packet data into the first synchronous plug-in of the plug-in collection can the by calling the appropriate function for the data on the synchronous plug-in collection interface (Managed RTS in this case).

c. Managed RTS 1605 does the following:
  i. Creates the appropriate managed data structures to hold the data in a managed-friendly way;
  ii. Calls the appropriate function on the collected managed synchronous plug-ins;
  iii. Ensures that each plug-in processes the data and returns back to RealTimeStylus component 1605 so that the next plug-in may be called; and
  iv. And so on until it calls the corresponding function on gesture recognizer 1609 (if gesture recognizer 1609 is being used).

d. Dynamic renderer 1615 may be called by the RealTimeStylus 1605. When dynamic renderer 1615 is finished rendering the new packets, it returns, the unmanaged RTS 1602 detects whether packet data was modified, and puts the appropriate data into the queue. If there were any "non-immediate" user data items to add, it adds them now.

e. Native RTS 1602 then posts the private message to the attached window; and f. Native RTS 1602 then looks in the input queue 1603 to see if any real-time data was added and if so calls the synchronous plug-in collection again passing that data. If no data was added, native RTS 1602 returns, allowing pen services 1601 to proceed and call RTS 1602 again with new digitizer data.

g. The private message is seen by the subclass proc on native RTS 1602, which retrieves the data from the queue 1603 and calls the appropriate function on the attached synchronous plug-in interface.

h. In this case, the managed RTS 1605 has connected itself and is called. The managed RTS 1605 then calls through to the corresponding function on the asynchronous plug-in 1612. This may be passed through asynchronous plug-in wrapper 1619.

i. The managed asynchronous plug-in 1612 then processes the data asynchronously, rendering or accumulating as appropriate.

j. The gesture recognizer 1609 may be called as part of the asynchronous plug-in collection off the RealTimeStylus component. The gesture recognizer 1609 internally accumulates packets until a CursorUp is encountered, at which point the accumulated packets are passed across the interoperability boundary into the native gesture recognizer 1613 for recognition.
  i. This operation returns information about which gesture(s) were recognized, and how many strokes correspond to each of the possible gestures;
  ii. Gesture recognizer 1609 then uses an AddUserDataToQueue method on managed RTS 1605 (with "immediate" set to false) to put the results of the gesture recognition into the queue 1604 for asynchronous consumption. (This causes the new gesture data to cross the interoperability boundary (or interop) immediately and sit in another queue until the native plug-in collection is complete); and
  iii. It additionally fires a traditional managed event to any listeners to notify the world in real time that a gesture just happened.
  iv. The current data is then returned by gesture recognizer 1609 to the RealTimeStylus component 1605 for any additional plug-ins in the plug-in collection.

Data Sets and Flows

The following lists event sink handlers and information associated with them:

Source IRealTimePen This back pointer gives the event sink implementation a back-reference to the source RealTimeStylus. This pointer allows two things: (a) access context information about the stylus instance (for instance, Dynamic Renderer 1615 needs to be able to do unit conversions between digitizer coordinates and pixels), and (b) be shared among multiple RTS event chains.

TabletContextID Allows the consumer of real-time data to efficiently accumulate data and use the tablet ID as an indexer in the data collection PacketDescription Describes the layout of data in a packet call. Different digitizers support different amounts of information, including (for instance) x, y, pressure, angle. The PacketDescription indicates to the receiver of a packet how this data is arranged in the flat array of integers that eventually arrives.

CursorID Allows the consumer of real-time data to efficiently accumulate data and use the cursor ID as an indexer for the data collection.

StylusInfo A simple structure that consolidates convenient information including:
  TabletContextID;
  CursorID;
  Inverted State (this is a tri-state indicating relevance and whether the cursor corresponds to the "eraser" end or "writing" end of a pen);
  Button States (whether each of up to 32 buttons is pressed); and
  Other relevant information as needed.

PropertyCountPerPacket Compromise parameter that allows a developer to infer the layout of packet data without an API call. (X, Y guaranteed to be the first and in that order, and count allows developer interested only in xy data to walk through the list skipping every $n^{th}$ element.

CountOfPackets The number of packets "bundled together" for efficiency (Pen services and/or the digitizer device driver determines when and how many packets are bundled in this way).

PacketData This is a read-only copy of the packet data.

CountOfPacketsRef The number of packets in the modified packetdata set which plug-in developers can allocate.

PacketDataRef This is a reference to the packet data which gives developers of plug-in objects the ability to modify the packet data in order to accomplish scenarios that involve real-time data manipulation.

In one implementation, one may not allow plug-in collection implementations to "know" whether packet data had been modified prior to entering the plug-in collection. Alternatively, the plug-in collections may be informed if the packet data has been modified. For instance, a flag on the data or a flag independent of the data may be set. One advantage of allowing plug-in collections the knowledge of whether packet data has been modified provides plug-in collections the ability to ignore modified packet data out of caution. On the other hand, this approach provides further options for a developer to make mistakes. More importantly, it muddles the simplicity and object oriented nature of the design pattern because plug-ins are not longer agnostic to the origin of the data. If the plug-in can inspect both the original and the modified data, then it is probably performing operations that belong in the previous plug-in.

For performance/efficiency reasons, one may internally maintain two data structures, so that unless the developer intends to modify the data one does not need to allocate the memory.

Data Synchronization

Figure 17A:
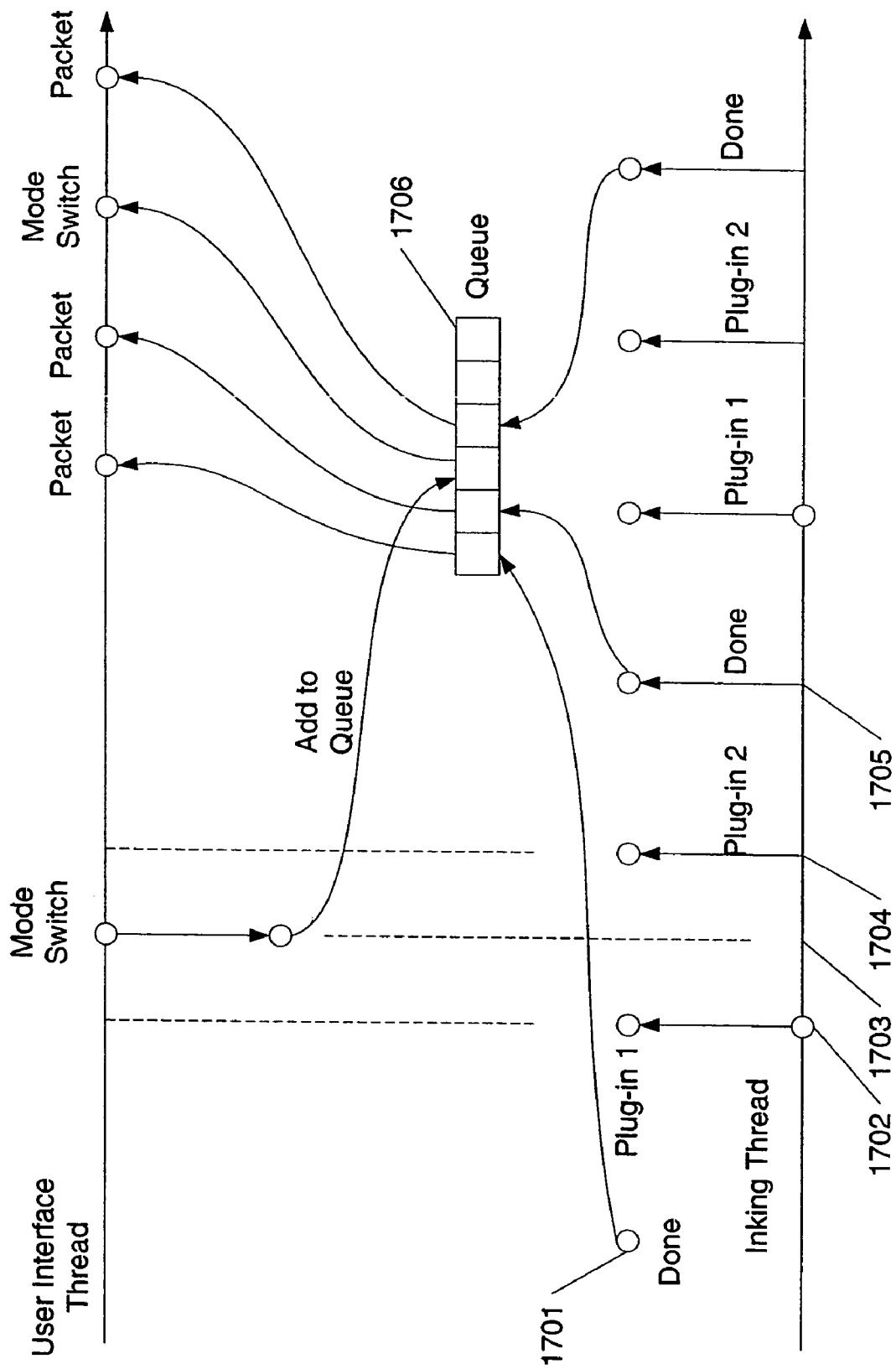
FIGS. 17A and 17B show how data may be placed in different locations in a queue to ensure synchronization in accordance with aspects of the present invention.

The following describes how data may be added to a queue to ensure synchronization as shown in FIG. 17A.

An ICO may use the input and output queues as a signaling mechanism, in order to synchronize other requests that come in on the UI thread with pending data coming through the inking thread.

FIG. 17A shows a mode switch that occurs while the system is processing information. The system shows the conclusion of a first processing ("done") at 1701. At time 1702, new stylus data is received and starts being processed by plug-in 1 at time 1702 and plug-in 2 at time 1704 and finishes at time 1705. Mode switching occurs at time 1703. For instance, if the user of an application is changing the "editing mode" from "ink" to "erase" and the application is busy, there is a reasonable likelihood that packet data streaming from the queue is still "ink" for some amount of time after the user mode changed.

However, instead of adding the mode switch event to queue 1706 at the present time, it is delayed until after the current processing is finished at time 1705 for stylus data. This may occur two ways. First, the mode switch operation event may be delayed until the stylus data starting in the plug-ins at time 1702 is completed. Second, the system may input the mode switch event in queue 1706 leaving enough room for the result from plug-in 2 at time 1705 to be placed in front of it in the queue 1706. So, in this case, the ICO may insert a "marker" into the output queue at the instant that the user made the mode change. After a period of time has elapsed that marker will be passed back into the ICO (via the CustomDataAdded method on real time stylus plug-in collection interface), at which point the ICO can begin interpreting incoming packet data as "eraser" requests.

Figure 17B:
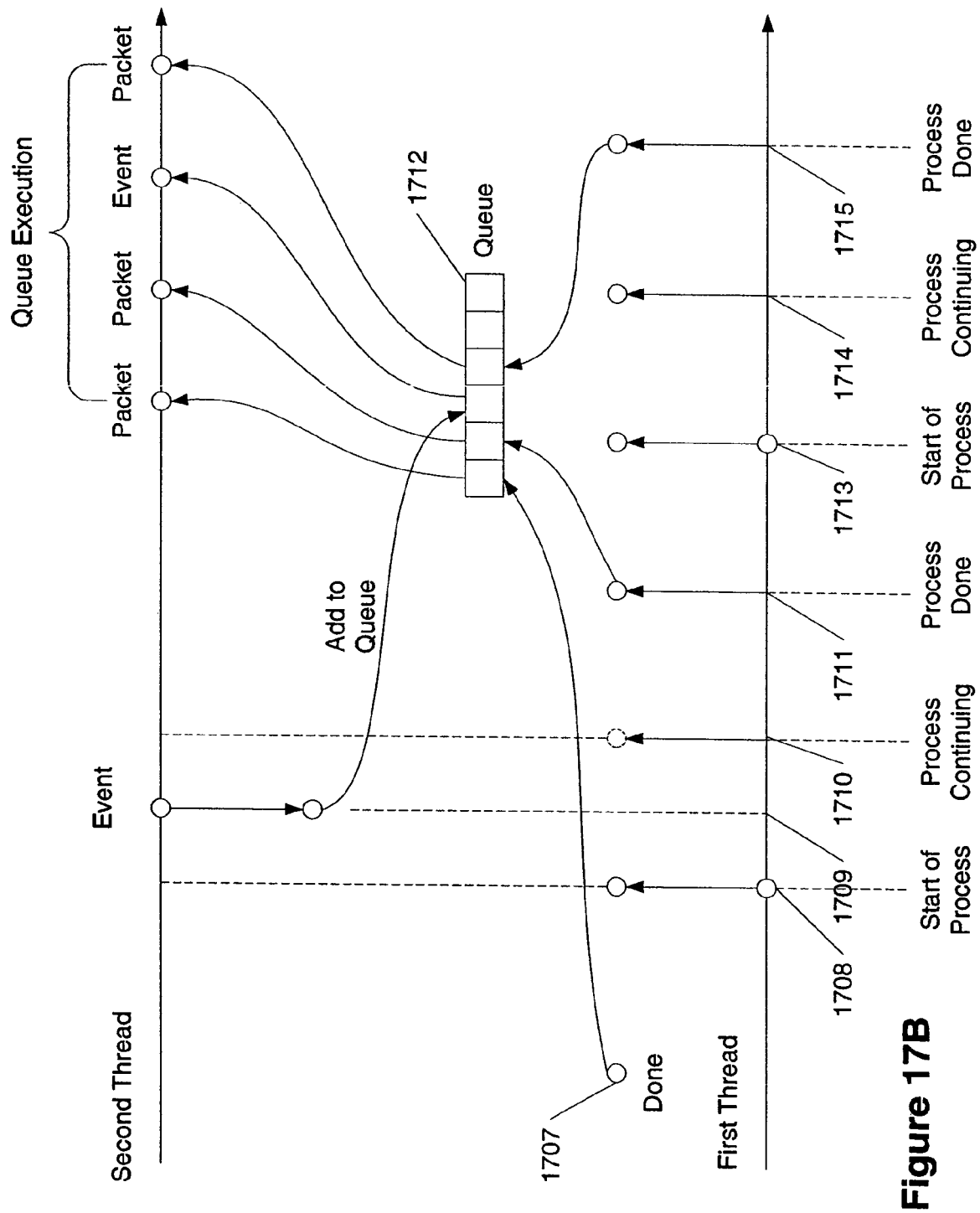

FIG. 17B shows a generic version of FIG. 17A. The end of a process for a first thread is shown by event 1707. It gets placed in queue 1712. Next at time 1708, another process on the first thread starts. At time 1709, an event occurs on a second thread. Because the process on the first thread started at point 1708, one expects that process to be addressed prior to the event at time 1709. However, because the process on the first thread continues at time 1710 then ends at time 1711, timing the insertion of the event at time 1709 to the time of the start of the process 1708 would be detrimental in that the event at time 1709 would be placed in the queue prior to the process being done at time 1711. Here, FIG. 17B shows the event at time 1711 being inserted a distance downstream in queue 1712 from the event generated from process done point 1707 by skipping at least one place in queue 1712. By keeping a place available in queue 1712 allows the completion of process 1708, 1710, 1711 to be properly placed in queue 1712 at a location ahead of the event of 1709 to allow the reading of the packets/events in queue 1712 to occur in an expected order. Here, the order may be summarized as packets/events occurring in the order their processes were started or events occurred. This ordering continues for the next process shown by points 1713 (start of process), 1714 (process continuing), and 1715 (process done).

Figure 18:
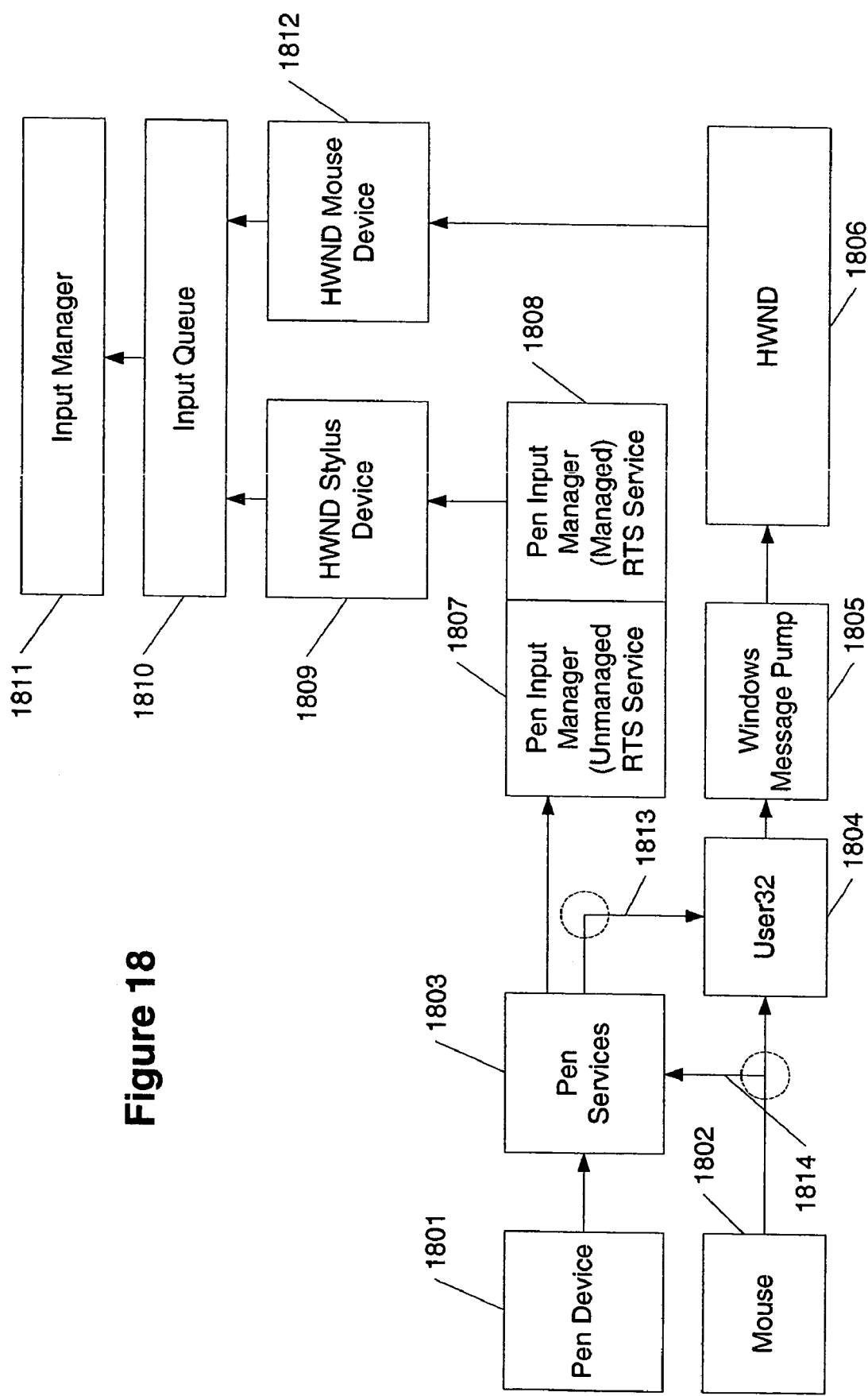
FIGS. 18 and 19 show various systems for handling pen data in accordance with aspects of the present invention.
Figure 19:
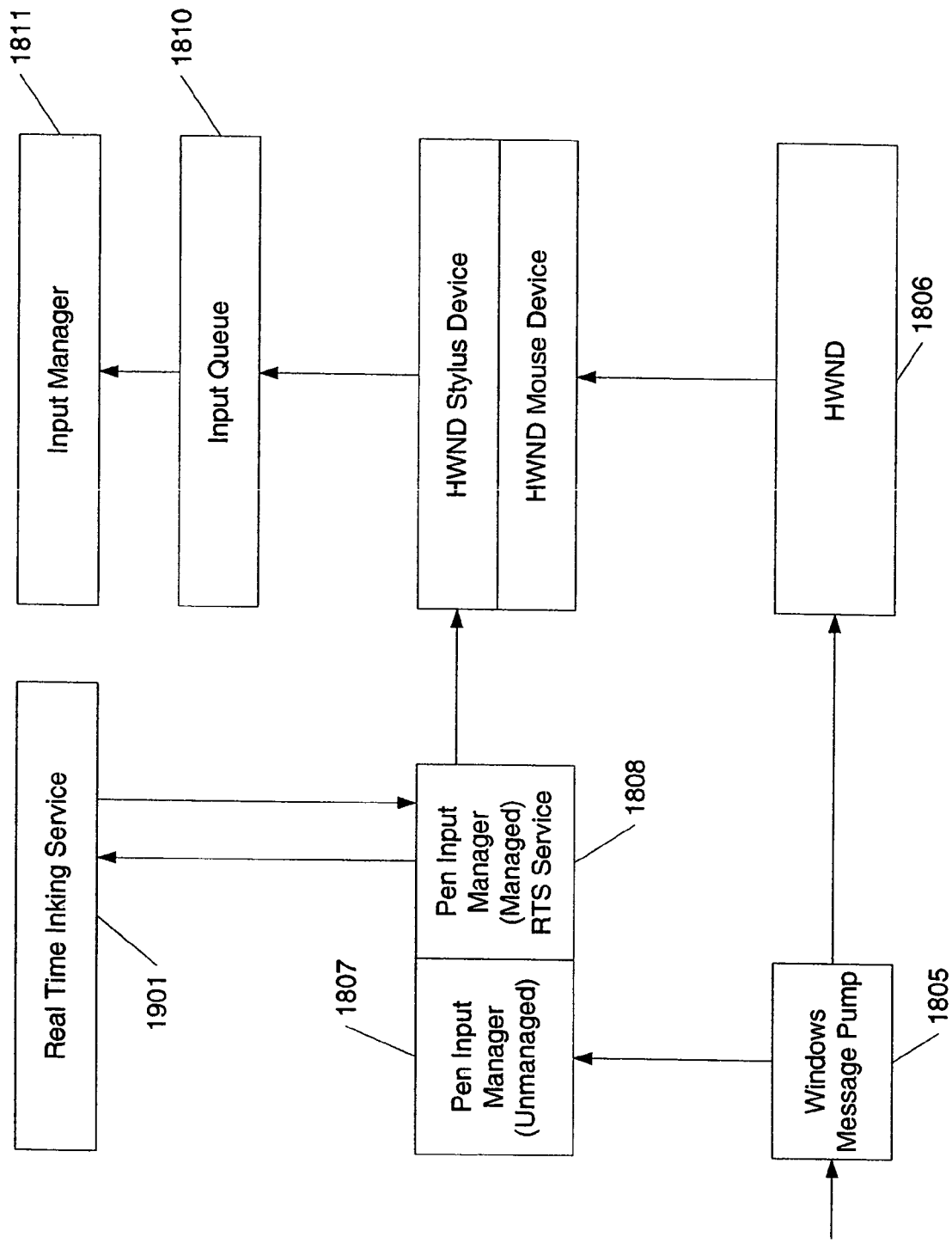

FIGS. 18 and 19 show various systems for handling pen data in accordance with aspects of the present invention.

Referring to FIG. 18, a pen device 1801 sends data to pen services 1803. A mouse 1802 may also generate information and send it to user32 (also known as user32.dll) 1804. Some pen data (clicking on buttons for example) may represent mouse events and is rerouted to user32 1804 to be handled as mouse events. Likewise, some mouse events may represent ink and is rerouted at 1814 to be handled as pen input. Mouse events are then passed to the windows message pump 1805, then HWND 1806, HWND mouse device 1812, the input queue 1810 and then input manager 1811. Pen input (for example, when the pen is moved into a range of a potential inking service) or a stylus event is sent to the pen input manager 1807/1808 (unmanaged and managed real time stylus services). The pen input manager 1807/1808 handles all the communication between the pen services 1803 and the application. This handling may be performed on a normal priority thread or on a high priority status thread. Pen services 1803 may generate various events. Pen events may be sent to the pen input manager 1807/1808 to bypass the standard messaging system 1804-1806 and 1812.

Pen services 1803 may generate the following events: stylus in range (where the stylus has come into range of the digitizer), stylus out of range (where the stylus can no longer be detected by the digitizer), stylus packets (raw point data from a digitizer—the pen may or may not be in contact with the digitizer), stylus in air points, tablet added/removed, and system gesture events (for instance, "press and hold" and hover events).

The stylus may generate raw preview events. These raw preview events may be handled by a real time inking service 1901 (from FIG. 19). Other services may listen for these events as well. The real time inking service 1901 may perform a number of steps on the raw preview events including:
 a. Check if event is a down "Packet" event. If not stop processing and return null.
 b. Check if event would have been on an inking element based on its cached layout information. If not stop processing and return null.
 c. Since this packet is for a "down" event, inside an inking area, then incrementally draw the stroke.
 d. Finally return to the pen input manager 1807/1808 the element on which the stroke was drawn.

The return value from the raw preview event is used by the pen input manager 1807/1808 to "Target" the event. If a non-null target is returned then the event may be placed on the input queue with that specific target. This ensures that ink that has been drawn on an element is actually delivered to that element rather than some other element as a result of other events in the input queue.

Now the stylus event is ready to become an input event. However in most cases, each stylus event also has a corresponding mouse message flowing through the message system. Before the pen input manager 1807/1808 can convert the stylus event into an input event, it should first match up the event with the corresponding mouse message. If necessary, the pen input manager 1807/1808 can wait for the mouse message to arrive.

Once the pen input manager 1807/1808 has both the mouse message and the stylus event, it combines the two into the appropriate input report and places the report on the input queue 1810.

Figure 20:
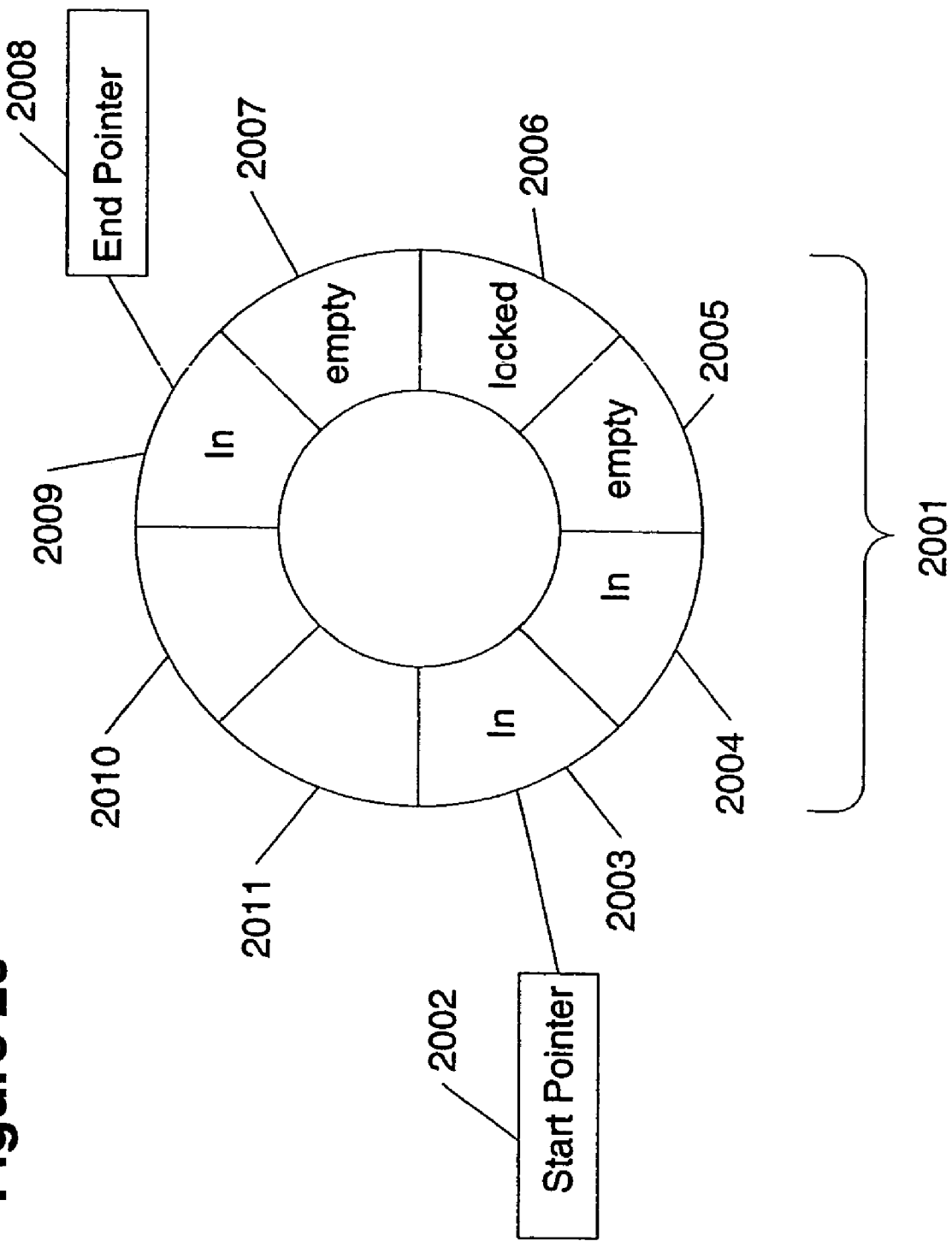
FIG. 20 shows a queue in accordance with aspects of the present invention.

FIG. 20 shows a queue in accordance with aspects of the present invention. FIG. 20 includes a queue 2001. For simplicity, the queue is shown as a circle. Alternative forms of the queue may also be used including a linear queue and other versions as are known in the art. Queue 2001 includes a start pointer 2002 and end pointer 2008. Queue 2001 also includes a number of locations having information (2003, 2004, and 2009). Locations 2005 and 2007 are empty. Location 2006 has been locked. Location 2006 may have been locked as a place holder to synchronize events and data from different sources (an example of which is shown in FIGS. 17A and 17B). Also, location 2006 may be locked when the data contained within it is being passed through a plug-in collection or chain. Locations 2010 and 2011 are empty as well. The number of empty spaces may be increased or decreased as needed. For instance, additional spaces may be added to store additional data if the queue is full. Alternatively, the size of the queue may be fixed such that any data more then can be held in the queue is discarded. This may provide a useful benefit to the user in that it provides an indication to the user that the system is highly involved with other processes and it would be helpful to slowdown on the creation of new data for the queue. The discarding of information may also show to the user that the system has locked up and entering additional data is not advised until the system continues processing again.

Application Programming Interfaces

The following provides an overview of the various application programming interfaces that may be used by aspects of the present invention.

The real time stylus may be part of a real time stylus input class. The instantiated real time stylus object may be attached to a window handle or control. The real time stylus may include default constructors. Using a default constructor permits one to accept input only from another real time stylus object.

To allow plug-ins to interact with a pen data stream, the real time stylus object may maintain two plug-in collections. The collections may be specified in a property of the real time stylus object (for instance, SyncPluginCollection for synchronous plug-ins and AsyncPluginCollection for asynchronous plug-ins). One may add a plug-in to either collection by calling an add method (for instance, StylusSyncPluginCollection.Add for adding a plug-in to the synchronous collection or StyluAsyncPluginCollection.Add for adding a plug-in to the asynchronous collection) on the appropriate property.

Synchronous plug-ins may implement an interface (for instance, IStylusSyncPlugin) and asynchronous plug-ins may implement a different interface (for instance, IStylusAsyncPlugin). Each plug-in may have property that specifies its data interest (for instance, IStylusSyncPlugin.DataInterest or IStylusAsyncPlugin.DataInterest). The real time stylus object may call notification methods of the plug-in for methods in which the plug-in has subscribed.

The real time stylus object implements the IStylusAsyncPlugin interface. To instantiate a real time stylus that accepts input from another real time stylus may include using a default constructor. Further alternative mechanisms may be used to associate a child or cascaded RTS with a parent. Another mechanism may use a dedicated pointer associated with a parent RTS to hold a reference to the child RTS. Here, the parent RTS would not need to implement the asynchronous plug-in interface.

The real time stylus object may have two or more internal queues that transport pen data. These include the input queue and the output queue. Another queue may be added between these two queues. Also, the input queue may be eliminated when data is only intended to enter the synchronous plug-ins from a pen data stream. The process that these queues use to handle pen data is described above in relation to at least FIGS. 6, 8, 11 and 13.

The following is an example scenario for using the real time stylus object on a form that collects ink.

a. Create a form that implements the IStylusAsyncPlugin interface.

b. Create a real time stylus object attached to a control on the form.

c. Set the form to be interested in (and therefore receive) notifications relating to a stylus contacting a surface (a StylusDown event), data packets, and stylus up (e.g., a StylusUp event) notifications in the form's property relating to data in which it is interested (e.g., a DataInterest property).

d. In the form's IStylusAsyncPlugin.StylusDown, IStylusAsyncPlugin.Packets, and IStylusAsyncPlugin.StylusUp methods, add code to handle the stylus down, packets, and stylus up notifications that are sent from the form's real time stylus object.

Each real time stylus object maintains a list of unique identifiers for the objects with which it can interact. The real time stylus object may have a few methods for translating between a unique identifier and the tablet object. These may include the GetTabletContextIDFromTablet and GetTabletFromTabletContextID methods.

The pen data may occupy its own name space (for instance, StylusInput.PluginData namespace).

A tablet property description object (e.g., TabletPropertyDescription object) may contain a property globally unique identifier (GUID) and a tablet property metrics (e.g., TabletPropertyMetrics) structure that describes the range, resolution, and units of the property for a specific tablet.

A method may exist that takes a unique tablet identifier and returns a collection of property description objects supported by the tablet. For instance, the GetTabletPropertyDescriptionCollection method of the real time stylus object takes the unique tablet identifier and returns the collection of TabletPropertyDescription objects supported by the tablet. The real time stylus object's GetDesiredPacketDescription method returns an array of GUIDs for the packet properties that the real time stylus object will forward to its plug-ins.

The set of packet properties that is sent to the plug-ins for a given tablet may be the intersection of the set returned by the GetTabletPropertyDescriptionCollection method and the set returned by a GetDesiredPacketDescription method. To modify the set of packet properties the real time stylus will pass to its plug-ins, the real time stylus object's SetDesiredPacket Description method may be called.

When the real time stylus object is enabled, each plug-in receives a call to its IStylusSyncPlugin.RealTimeStylusEnabled or IStylusAsyncPlugin.RealTimeStylusEnabled method. The RealTimeStylusEnabledData object passed in the notification contains a collection of the context identifiers for the available tablets at the time the RealTimeStylus object is enabled. When a tablet that the RealTimeStylus object can use is added to or removed from a pen-enabled computing system while the RealTimeStylus object is enabled, the RealTimeStylus object notifies its plug-ins that a tablet has been added or removed.

Styluses may have additional interfaces. Each stylus may have information associated with it that describes packets associated with the styluses. The real time stylus object may pass information about the styluses to the plug-ins in a number of notification methods. Information about a pen or stylus may be represented by a stylus object. The object is a snapshot of the state of the tablet pen at the time the data was gathered. Since plug-ins are receiving the tablet pen data as part of the tablet pen data stream, the plug-ins should use the information in the stylus object instead of checking for the current state of a particular tablet pen through the cursor class.

The following describes plug-ins and the RealTimeStylus class. Plug-ins, objects which implement the IStylusSyncPlugin or IStylusAsyncPlugin interface, can be added to a real time stylus object.

Both the IStylusSyncPlugin and IStylusAsyncPlugin interfaces define the same methods. These methods allow the real time stylus object to pass the pen data to each plug-in. The IStylusSyncPlugin.DataInterest and IStylusAsyncPlugin.DataInterest properties allow each plug-in to subscribe to specific data in the tablet pen data stream. A plug-in should only subscribe to the data necessary to perform its task, which minimizes potential performance issues. Alternatively, additional subscriptions may be included for a plug-in.

The real time stylus object may use objects in the StylusInput.PluginData namespace to pass the pen data to its plug-ins. The real time stylus also catches exceptions thrown by plug-ins. When it does so, it may notify the plug-ins by calling the IStylusSyncPlugin.Error or IStylusAsyncPlugin.Error method.

The following describes plug-in data and the real time stylus class.

Plug-ins for the real time stylus may implement either the IStylusSyncPlugin or IStylusAsyncPlugin interface. One may or may not implement all methods in the real time stylus.

The methods defined on the interfaces may use objects in the StylusInput.PluginData namespace to pass the pen data to the plug-ins. The following table describes the data objects that are parameters in the notification methods and lists the DataInterestMask value associated with the notification.

| Plug-in Data | DataInterestMask Value | Description |
| --- | --- | --- |
| CustomStylusData | CustomStylusDataAdded | Custom application data that is added by a plug-in. |
| ErrorData | Error | Error information that the real time stylus object adds in response to an unhandled exception in one of its plug-ins. |
| InAirPacketsData | InAirPackets | Packet information for stylus motion while the stylus is in-air above the digitizer. |
| InAirPacketsData | Packets | Packet information for stylus motion while the stylus is touching the digitizer. |
| RealTimeStylusDisabledData | RealTimeStylusDisabled | Information the real time stylus object adds when it is being disabled. |
| RealTimeStylusEnabledData | RealTimeStylusEnabled | Information the real time stylus object adds when it is being enabled. |
| StylusButtonDownData | StylusButtonDown | Information about the particular stylus button that is being depressed. |
| StylusButtonUpData | StylusButtonUp | Information about the particular stylus button that is being released. |
| StylusDownData | StylusDown | Packet information for stylus as the stylus is brought in contact with the digitizer. |
| StylusInRangeData | StylusInRange | Information about the particular stylus that is entering the input area of the real time stylus object or entering the detection range of the digitizer above the input area of the real time stylus object. |
| StylusOutOfRangeData | StylusOutOfRange | Information about the particular stylus that is leaving the input area of the real time stylus object or leaving the detection range of the digitizer above the input area of the real time stylus disabled data object. |
| StylusUpData | StylusUp | Packet information for stylus as the stylus is lifted from the digitizer. |
| SystemGestureData | SystemGesture | Information the RealTimeStylus object adds when it detects a system gesture. |
| TabletAddedData | TabletAdded | Information about the tablet that is being added. |
| TabletRemovedData | TabletRemoved | Information about the tablet that is being removed. |

The real time stylus object passes information about the tablet pen to its plug-ins in a number of the notification methods. Information about the tablet pen is represented by a Stylus object. This object is a snapshot of the state of the tablet pen at the time the data was gathered. Since plug-ins are receiving the tablet pen data as part of the tablet pen data stream, the plug-ins should use the information in the Stylus object instead of checking for the current state of a particular tablet pen through the Cursor class. Each Stylus object contains the tablet context identifier for the tablet that generated the data.

The following 13 functions may be implemented on the synchronous and asynchronous interfaces. The table compares the information that is passed through the various events. The list of events and parameters is illustrative and not exhaustive. Other events and parameters may be used with or in place of the following.

Many of the synchronous parameters differ from the asynchronous parameters only in that the former allows the recipient to modify the data passing through the queue. Alternatively, both sets of parameters may be allowed to modify the data passing through the queues.

| Function | Purpose | Synchronous Parameter Descriptions | Asynchronous Parameter Descriptions |
| --- | --- | --- | --- |
| ContextCreate (a.k.a. RTSEnabled) | Used to determine when the tablet context has been created so that event chains can be enabled. Consumers of this event can use this to know when RTS is finished with tablet initialization and is ready to begin firing data to client code. | Includes the source of the pen (including but not limited to a pen ID), the tablet identification and a description of the data packets. | Includes the source of the pen (including but not limited to a pen ID), the tablet identification and a description of the data packets. |
| ContextDestroy (a.k.a. RTSDisabled) | Used to determine when the tablet context has been destroyed so that RTS can clean up its objects. Consumers of this event can use this to know when RTS is about to free a tablet context (perhaps because RTS.Enabled is false) and cache any PacketDescription data as needed before it is no longer available. | Includes the source of the pen (including but not limited to a pen ID) and the tablet identification | Includes the source of the pen (including but not limited to a pen ID) and the tablet identification |
| CursorNew | Notification that a new stylus has been encountered by the digitizer | Includes the source of the pen (including but not limited to a pen ID) and information relating to the stylus (including but not limited to buttons on the stylus having been activated and the like) | Includes the source of the pen (including but not limited to a pen ID) and information relating to the stylus (including but not limited to buttons on the stylus having been activated and the like) |
| CursorInRange | Notification that a stylus has moved into range of the digitizer | Includes the source of the pen (including but not limited to a pen ID) and information relating to the stylus (including but not limited to buttons on the stylus having been activated and the like) | Includes the source of the pen (including but not limited to a pen ID) and information relating to the stylus (including but not limited to buttons on the stylus having been activated and the like) |
| CursorOutOfRange | Notification that a stylus has moved out of range of the digitizer | Includes the source of the pen (including but not limited to a pen ID) and information relating to the stylus (including but not limited to buttons on the stylus having been activated and the like) | Includes the source of the pen (including but not limited to a pen ID) and information relating to the stylus (including but not limited to buttons on the stylus having been activated and the like) |
| CursorDown | Notification that a stylus tip is "touching" the digitizer surface | SourceRealTimePen, StylusInfo, PropertyCountPerPacket, PacketDataRef | SourceRealTimePen, StylusInfo, PropertyCountPerPacket, PacketData |

-continued

| Function | Purpose | Synchronous Parameter Descriptions | Asynchronous Parameter Descriptions |
|---|---|---|---|
| CursorUp | Notification that a stylus tip is no longer touching the digitizer surface | Includes the source of the pen (including but not limited to a pen ID) and information relating to the stylus (including but not limited to buttons on the stylus having been activated and the like). This may also include the property count per data packet and a reference to the packet data type. | Includes the source of the pen (including but not limited to a pen ID) and information relating to the stylus (including but not limited to buttons on the stylus having been activated and the like). This may also include the property count per data packet and a reference to the packet data type. |
| InAirPackets | Notification of stylus movement above the digitizer surface | Includes the source of the pen (including but not limited to a pen ID) and information relating to the stylus (including but not limited to buttons on the stylus having been activated and the like). This may also include the property count per data packet and a reference to the packet data type. This may also include a data packet buffer length and the count of the data packets. | Includes the source of the pen (including but not limited to a pen ID) and information relating to the stylus (including but not limited to buttons on the stylus having been activated and the like). This may also include the property count per data packet and a reference to the packet data type. This may also include a data packet buffer length and the count of the data packets. |
| Packets | Notification of stylus movement while touching the digitizer surface | Includes the source of the pen (including but not limited to a pen ID) and information relating to the stylus (including but not limited to buttons on the stylus having been activated and the like). This may also include the property count per data packet and a reference to the packet data type. This may also include a data packet buffer length and the count of the data packets. | Includes the source of the pen (including but not limited to a pen ID) and information relating to the stylus (including but not limited to buttons on the stylus having been activated and the like). This may also include the property count per data packet and a reference to the packet data type. This may also include a data packet buffer length and the count of the data packets. |
| SystemEvent | Notification of a system event or gesture. Examples include "tap", "double tap", "press & hold", "shake" | Includes the source of the pen (including but not limited to a pen ID) and information relating to the stylus (including but not limited to buttons on the stylus having been activated and the like). This may also include system event information and data relating to the system event. | Includes the source of the pen (including but not limited to a pen ID) and information relating to the stylus (including but not limited to buttons on the stylus having been activated and the like). This may also include system event information and data relating to the system event. |
| TabletAdded | Notification of a new digitizer connected to the | Includes the source of the pen (including but not | Includes the source of the pen (including |

-continued

| Function | Purpose | Synchronous Parameter Descriptions | Asynchronous Parameter Descriptions |
|---|---|---|---|
| | system (typically an external USB device) | limited to a pen ID) and information relating to the tablet | but not limited to a pen ID) and information relating to the tablet |
| TabletRemoved | Notification of a digitizer disconnected from the system (typically an external USB device) | Includes the source of the pen (including but not limited to a pen ID) and information relating to the tablet that was removed | Includes the source of the pen (including but not limited to a pen ID) and information relating to the tablet that was removed |
| UserData | Arbitrary user data, uniquely identified (for instance, by a GUID). This is used by a specialized plug-ins which wants to pass information downstream to the Ink Collection Object through the queue and guarantee that it comes in the right order with respect to the rest of the real-time data described above. | n/a | Includes the source of the pen (including but not limited to a pen ID), a GUID associated with the user's data, an indication of the size of the user's data, and the content of the user's data |

Aspects of the present invention have been described in terms of illustrative embodiments thereof. Numerous other embodiments, modifications and variations within the scope and spirit of the appended claims will occur to persons of ordinary skill in the art from a review of this disclosure.

We claim:

1. A computing system that orders events from a keyboard, mouse, and stylus comprising:
a storage;
a processor exchanging information with said storage, said processor hosting a pen services component, said pen services receiving information from said mouse and said stylus, ordering said information, and forwarding information related to electronic ink to a pen input manager;
a first input receiving information from said mouse; and
a second input receiving information from said stylus,
wherein the pen input manager includes a dynamic renderer and a static renderer,
wherein said pen input manager includes an unmanaged portion and a managed portion.

2. A system for ordering inputs from a stylus and a mouse comprising:
a processor supporting components, said the components comprising:
a windows message pump that receives input from a user;
a pen input manager that receives stylus input from said windows message pump;
an HWND stylus device that outputs said stylus input to an input queue;
a real time inking service attached to said pen input manager, said real time inking service processing said stylus input, said real time inking service outputting said stylus input to a dynamic renderer and a static renderer;
said processor including:
a HWND component that receives mouse input from said windows message pump;
a HWND mouse component that receives output from said HWND component and forwards said mouse input to said input queue.
wherein said input queue also receives mouse inputs,
wherein said pen input manager component includes an unmanaged portion and a managed portion,
wherein said real time inking service is attached to said managed portion of said pen input manager.

3. A method for handling stylus input and mouse input comprising the steps of:
receiving at a windows message pump said stylus input and said mouse input;
sending said stylus input to a pen input manager;
sending said mouse input to a HWND device manager;
exchanging said stylus input with a real time inking service having a dynamic renderer and a static renderer;
outputting information from said real time inking service to a HWND stylus device;
outputting information from said HWND stylus device to an input queue; and
receiving in said input queue information relating to said stylus input and information relating to said mouse input; and
outputting information relating to said stylus input and said mouse input from said input queue to an input manager,
wherein said information output from said HWND stylus device is said information relating to said stylus input.

* * * * *